(12) United States Patent
Tsuda et al.

(10) Patent No.: US 9,535,585 B2
(45) Date of Patent: Jan. 3, 2017

(54) METHOD AND DEVICE FOR DISPLAYING IMAGE

(71) Applicant: NINTENDO CO., LTD., Kyoto (JP)

(72) Inventors: Munetaka Tsuda, Kyoto (JP); Yasuto Kakimoto, Kyoto (JP); Ryoma Aoki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 780 days.

(21) Appl. No.: 13/728,192

(22) Filed: Dec. 27, 2012

(65) Prior Publication Data

US 2013/0167070 A1 Jun. 27, 2013

(30) Foreign Application Priority Data

Dec. 27, 2011 (JP) .................................. 2011-285972
May 15, 2012 (JP) .................................. 2012-111270

(51) Int. Cl.
G06F 3/0485 (2013.01)
G06F 3/0484 (2013.01)
G06F 3/01 (2006.01)

(52) U.S. Cl.
CPC .......... *G06F 3/04845* (2013.01); *G06F 3/017* (2013.01); *G06F 3/0485* (2013.01); *G06F 2203/04806* (2013.01); *G09G 2340/045* (2013.01); *G09G 2340/0464* (2013.01); *G09G 2340/145* (2013.01); *G09G 2354/00* (2013.01)

(58) Field of Classification Search
None
See application file for complete search history.

(56) References Cited

U.S. PATENT DOCUMENTS

| 5,602,566 A | 2/1997 | Motosyuku et al. |
| 7,705,864 B2 * | 4/2010 | Ahmed .................. G09G 5/391 345/1.1 |
| 8,423,915 B2 | 4/2013 | Aida et al. |
| 2006/0050090 A1 * | 3/2006 | Ahmed .................. G09G 5/391 345/660 |
| 2006/0111634 A1 | 5/2006 | Wu |
| 2006/0200517 A1 | 9/2006 | Nelson et al. |
| 2010/0058226 A1 | 3/2010 | Flake et al. |

(Continued)

FOREIGN PATENT DOCUMENTS

| EP | 1 956 478 | 8/2008 |
| EP | 2150052 | 2/2010 |

(Continued)

OTHER PUBLICATIONS

U.S. Office Action (10 pgs.) dated Feb. 20, 2014 isuued in co-pending U.S. Appl. No. 13/461,501 of Tsuda, et al., filed May 1, 2012.

(Continued)

*Primary Examiner* — Maryam Ipakchi
(74) *Attorney, Agent, or Firm* — Nixon & Vanderhye PC

(57) ABSTRACT

An example information-processing device includes a display controller that, when a scaling operation for changing a scale of an image to be displayed is not performed, displays in a display the image with a first magnification, and when the operation is performed, displays in the display the image with a second magnification that is greater than the first magnification.

27 Claims, 14 Drawing Sheets

(56) References Cited

U.S. PATENT DOCUMENTS

| | | | |
|---|---|---|---|
| 2010/0199214 A1* | 8/2010 | Mikawa | G06F 3/0481 |
| | | | 715/800 |
| 2010/0201615 A1* | 8/2010 | Tupman | G06F 1/1626 |
| | | | 345/156 |
| 2011/0057880 A1* | 3/2011 | Kasahara | G06F 1/1626 |
| | | | 345/158 |
| 2011/0225544 A1 | 9/2011 | Demar et al. | |
| 2012/0047036 A1 | 2/2012 | Allan | |
| 2013/0167070 A1* | 6/2013 | Tsuda | G06F 3/04845 |
| | | | 715/785 |

FOREIGN PATENT DOCUMENTS

| | | |
|---|---|---|
| EP | 2299352 | 3/2011 |
| EP | 2 375 304 | 10/2011 |
| JP | 4-270384 | 9/1992 |
| JP | 5-216972 | 8/1993 |
| JP | H06-4208 | 1/1994 |
| JP | H07-64754 | 3/1995 |
| JP | 2001-159951 | 6/2001 |
| JP | 2001-177741 | 6/2001 |
| JP | 2002-132410 | 5/2002 |
| JP | 2006-244504 | 9/2006 |
| JP | 2008-8917 | 1/2008 |
| WO | 99/18495 | 4/1999 |
| WO | WO 2011/024914 | 3/2011 |

OTHER PUBLICATIONS

U.S. Office Action (15 pgs.) dated Apr. 25, 2014 issued in co-pending U.S. Appl. No. 13/606,580.
Search Report for EP 12166660 dated Oct. 31, 2012.
Office Action (5 pages) dated Aug. 18, 2015 issued in European Application No. 12 166 660.6-1904.
Office Action (11 pgs.) dated Jun. 30, 2015 issued in co-pending U.S. Appl. No. 13/461,501.
U.S. Office Action (12 pages) dated Oct. 15, 2015 issued in co-pending U.S. Appl. No. 14/461,501.
Notice of Allowance (8 pages) dated Jan. 5, 2015 issued in related U.S. Appl. No. 13/606,580 of Tsuda, filed Sep. 7, 2012.
Final Office Action (11 pages) dated Mar. 18, 2015 issued in co-pending U.S. Appl. No. 13/461,501 of Tsuda, filed May 1, 2012.
U.S. Office Action issued in U.S. Appl. No. 13/461,501 dated Aug. 7, 2014.
U.S. Office Action issued in U.S. Appl. No. 13/606,580 dated Sep. 29, 2014 (18 pp.).
Oct. 16, 2013 Search Report in EP 12198039.5, 10 pages.
Office Action (10 pgs.) dated Nov. 17, 2014 issued in co-pending U.S. Appl. No. 13/461,501.
Office Action (8 pages), issued in corresponding EP Application No. 12166660.6 dated Jun. 22, 2016.
European Patent Office, "Communication Pursuant to Article 94(3) EPC," issued in connection with European Patent Application No. 12 198 039.5, dated Feb. 9, 2016.
Japanese Office Action—Decision of Refusal (7 pages) dated Sep. 27, 2016 issued in corresponding Japanese Application No. 2012-111270 and English translation (8 pages).
Takano, "Master zoon function 120%, Technique of screen display that is easy on eyes", Nikkei Personal Computing, Nikkei Business Publications, Inc., No. 393, Sep. 17, 2001, (11 pages).

* cited by examiner

US 9,535,585 B2

METHOD AND DEVICE FOR DISPLAYING IMAGE

CROSS-REFERENCE TO RELATED APPLICATIONS

This application is based on and claims priority under 35 U.S.C. 119 from Japanese Patent Application Nos. 2011-285972 and 2012-111270, which were filed on Dec. 27, 2011 and May 15, 2012.

FIELD

The technology herein relates to a change of a scale of a displayed image.

BACKGROUND AND SUMMARY

When an electronic document such as a webpage is displayed, a part of the image may be magnified.

This application provides an information-processing device includes a display controller that, when a scaling operation for changing a scale of an image to be displayed is not performed, displays the image with a first magnification in a display, and when the scaling operation is performed, displays the image with a second magnification that is greater than the first magnification in the display.

DETAILED DESCRIPTION OF NON-LIMITING EXAMPLE OF EMBODIMENTS

Figure 1:
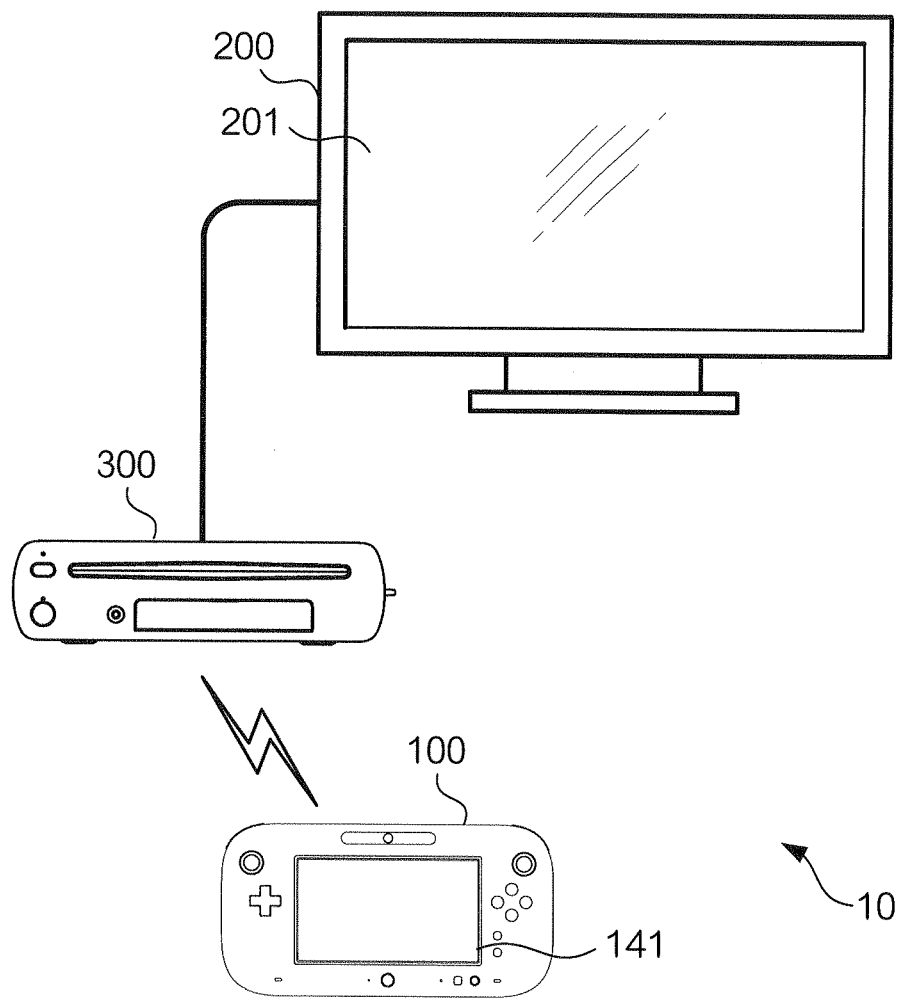
FIG. 1 is a diagram showing an example of a non-limiting configuration of a display system.

FIG. 1 is a diagram showing a configuration of display system 10, which is an exemplary embodiment of the present embodiment. Display system 10 is a system for displaying a variety of images in accordance with operations performed by a user. An image displayed in display system 10 is, for example, an image of a game or a webpage, but may be another image (such as an electronic document, a still image or a moving image taken by a user, a television broadcast image, and so on).

Display system 10 is configured to include controller 100, monitor 200, and base station 300. It is to be noted, however, that display system 10 may include a controller other than controller 100, or may be provided with multiple controllers 100. Further, display system 10 may be used without use of monitor 200.

Controller 100 is a hand-held terminal on which an image is displayed, by which a user can perform various operations. Controller 100 herein is a portable display that has display region 141 and is to be held and operated by a user. It is to be noted that controller 100 not only presents information visually by displaying images, but also may present audible or tactile information by using sound or vibration.

Monitor 200 is a device for displaying an image, and may be, for example, a television set for receiving a television broadcast. In this explanation, monitor 200 is a stationary-type display. It is to be noted that monitor 200 does not have to have a function of receiving a television broadcast, and may be a display of a personal computer, or the like. It is assumed that monitor 200 has display region 201 having a larger size than display region 141 of controller 100, though display region 201 may be the same size as or smaller than display region 141 of controller 100. Further, display region 201 of monitor 200 and display region 141 of controller 100 do not have to have the same aspect ratio. Furthermore, monitor 200 is capable of presenting information not only visually but also audibly, similarly to controller 100, though monitor 200 and a speaker may be configured as separate units.

Base station 300 is an information-processing device for controlling operation of controller 100 and monitor 200. To achieve the purpose, base station 300 is connected to each of controller 100 and monitor 200 via wired or wireless communication. It is assumed here that base station 300 conducts wireless communication with controller 100 and conducts wired communication with monitor 200, though communication may be performed in another manner.

Figure 2:
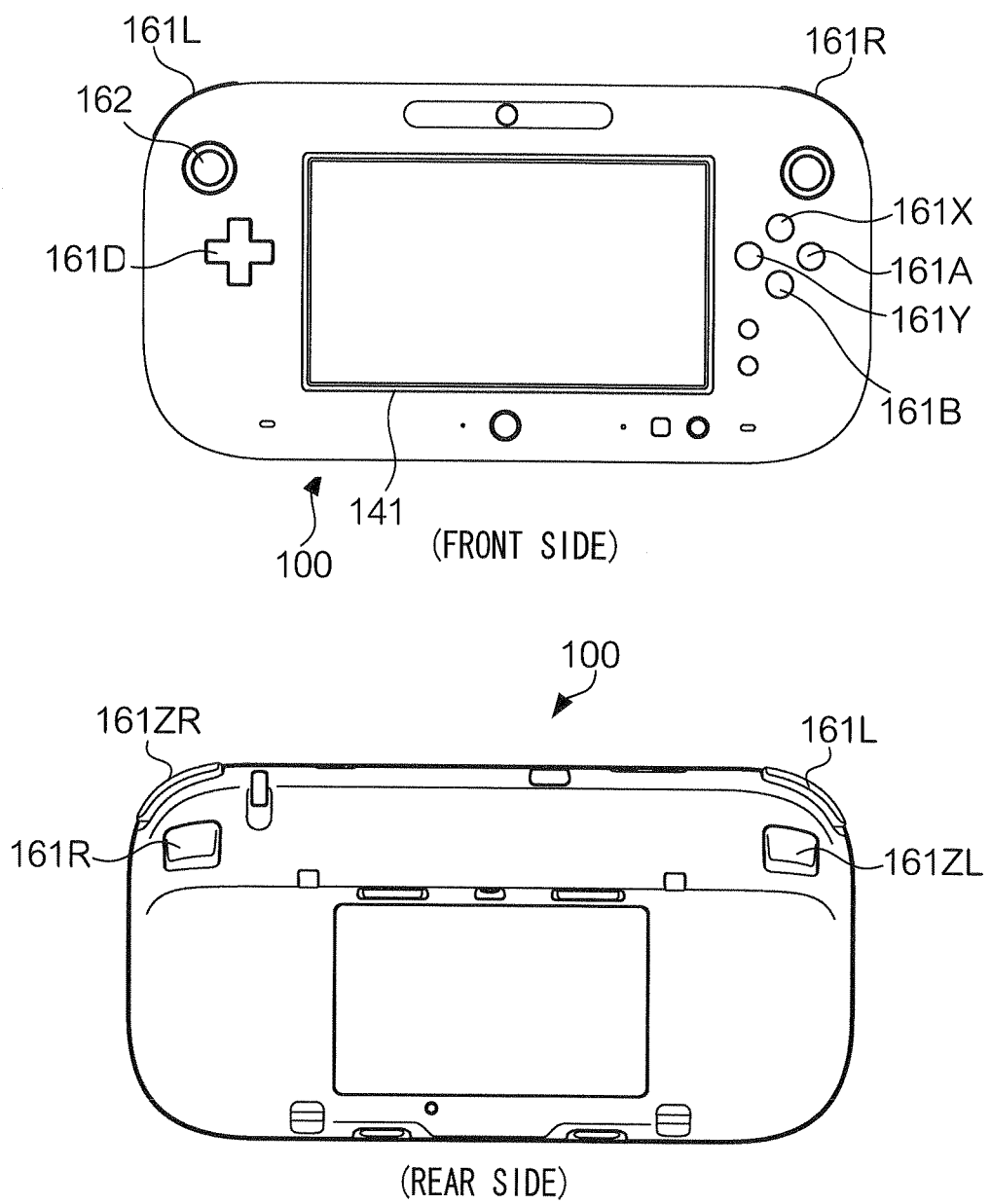
FIG. 2 is a diagram showing an example of a non-limiting external configuration of a controller.

FIG. 2 is a diagram showing an external configuration of controller 100, and shows a side on which display region 141 is provided and a side opposite thereto. For convenience of explanation, the side on which display region 141 is provided will be referred to as a "front side" and the opposite side will be referred to as a "rear side" in the following description. Thus, the front side is a side facing the user when the user operates controller 100. Further, in the following description, the sides of controller 100 other than the front and rear sides will collectively be referred to as a "perimeter side."

On the front side of controller 100, there are provided A button 161A, B button 161B, X button 161X, Y button 161Y, and D-pad 161D, in addition to display region 141. On the perimeter side of controller 100, there are provided L button 161L and R button 161R. Further, on the rear side of controller 100, there are provided ZL button 161ZL and ZR button 161ZR. In the following description, these buttons may simply be referred to as "buttons 161."

Buttons 161 are hardware keys that can be pressed. It is to be noted here that a hardware key is a key provided at a predetermined position of controller 100, and may also be referred to as a physical key. Buttons 161 generate operation information that indicates a state of pressing of each button (or indicates whether each button is pressed).

Further, in addition to buttons 161, slide pad 162 is provided on the front side of controller 100. Slide pad 162 generates operation information that represents a strength and a direction of a force that is imparted to slide pad 162 by a finger of the user. It is to be noted that slide pad 162 may be provided in the right-hand portion of controller 100 from the user's perspective or may be provided in each of the right-hand and left-hand portions.

Figure 3:
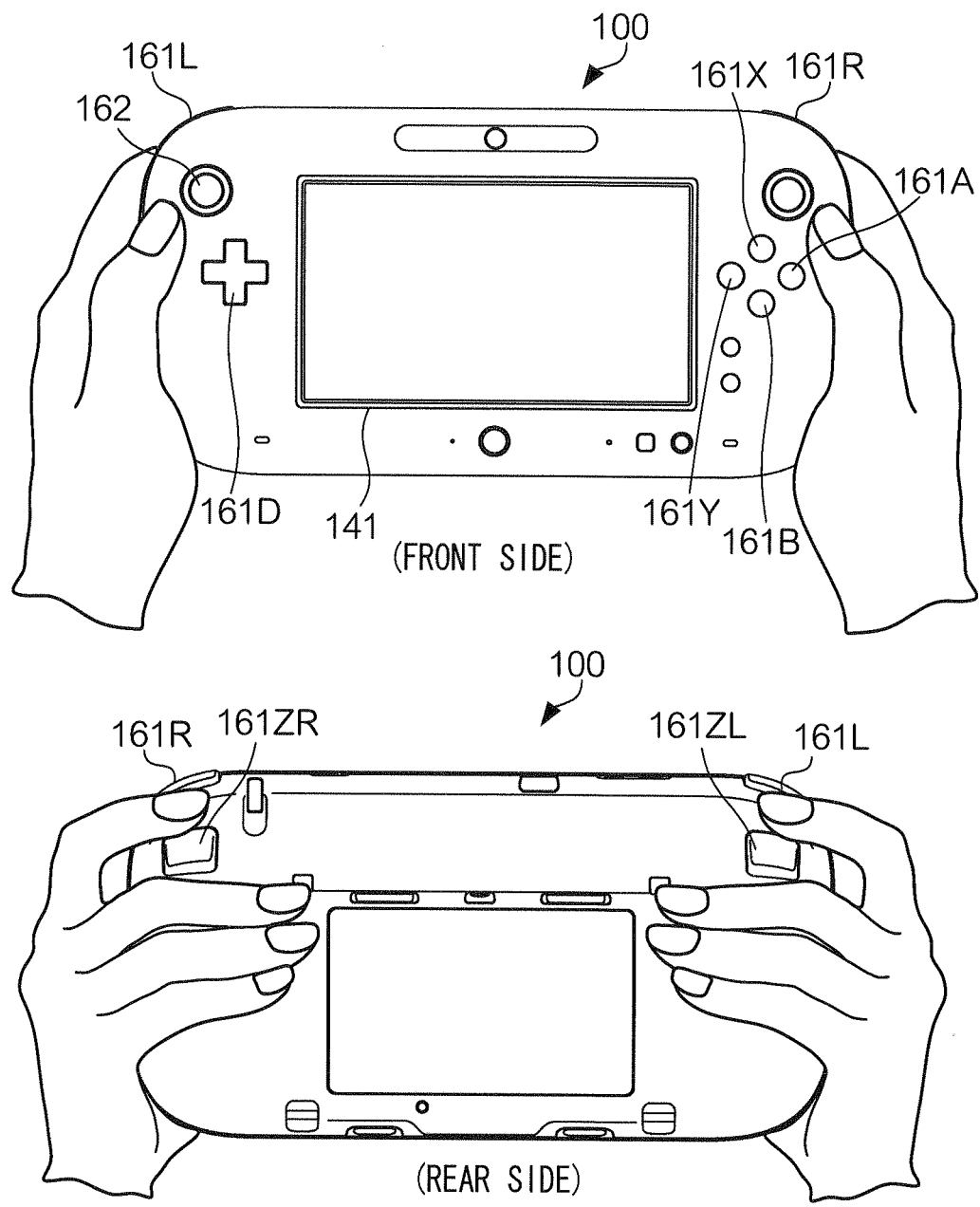
FIG. 3 is a diagram illustrating an example of a non-limiting state when a user holds the controller.

FIG. 3 is a diagram illustrating a state when a user holds controller 100 with both hands. When the user holds controller 100 as shown, the user can press ZL button 161ZL with the index finger of the left hand and press ZR button 161ZR with the index finger of the right hand. In a state where the user presses ZL button 161ZL and ZR button 161ZR using both hands, the user can hold controller 100 more steadily as compared to a case where these buttons are not pressed, and thus, if the user performs various operations on the front side of controller 100, controller 100 has a reduced tendency to move or shake. It is to be noted that the effect of holding controller 100 steadily also may be obtained by pressing L button 161L and R button 161R simultaneously.

It is also to be noted that the way of holding controller 100 is not limited to the example shown in FIG. 3. For example, the user may place the index fingers near L button 161L and R button 161R and press ZL button 161ZL and ZR button 161ZR with the middle fingers. Further, the user may hold controller 100 so that the longer side extends in the vertical direction rather than in the horizontal direction.

Figure 4:
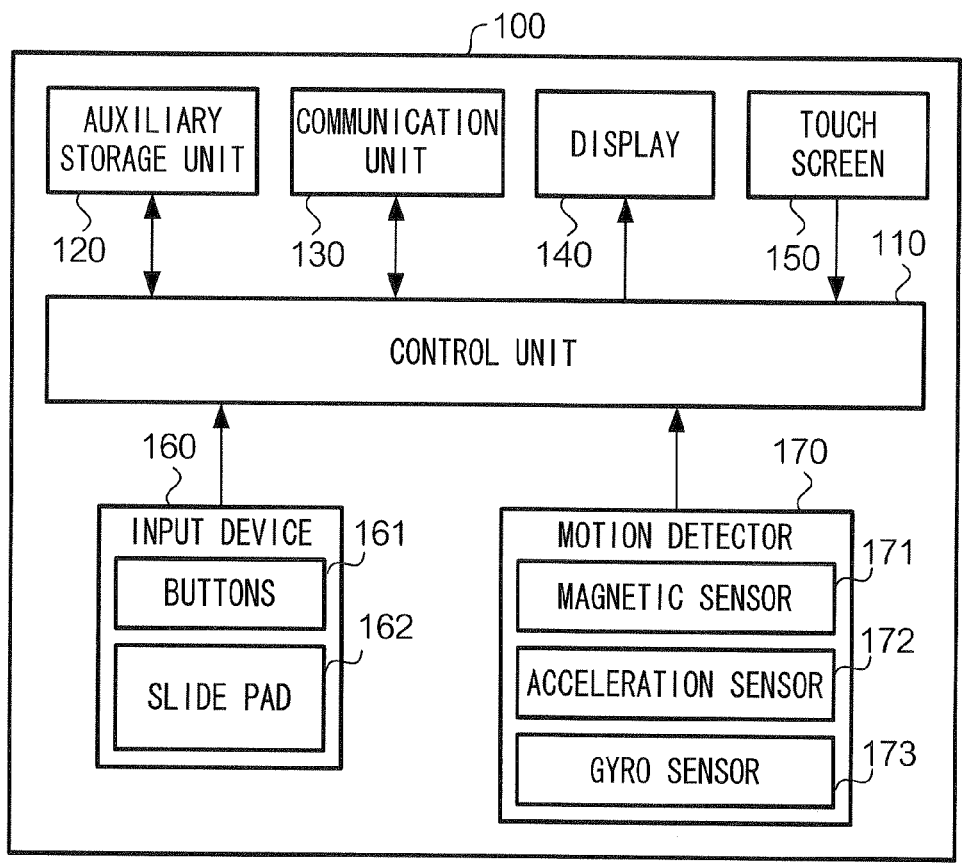
FIG. 4 is a block diagram showing an example of a non-limiting hardware configuration of the controller.

FIG. 4 is a block diagram showing a hardware configuration of controller 100. Controller 100 includes control unit 110, auxiliary storage unit 120, communication unit 130, display 140, touch screen 150, operation unit 160, and motion detector 170. Though not shown in the drawing, controller 100 may further include a camera for taking a still image or a moving image, a microphone and a speaker for input and output of sound, a vibrator for vibrating controller 100, a communication means other than communication unit 130 (e.g., an infrared communication means for communicating with another controller), and so on.

Control unit 110 is a means for controlling operations of various units of controller 100. Control unit 110 includes a processing device such as a CPU (Central Processing Unit), a memory serving as a main memory device, an input/output interface for communicating information with various units of controller 100, and so on, and executes a program(s) to control display of images or data transmission and reception to and from base station 300. Further, control unit 110 includes a codec for compressing image data to be sent to base station 300 and expanding image data received from base station 300. The format for compression and expansion performed by the codec is H.264, for example, though the format is not particularly limited.

Auxiliary storage unit 120 is a means for storing data used by control unit 110. Auxiliary storage unit 120 is a flash memory, for example. Auxiliary storage unit 120 is capable of storing data such as bookmarks, which will be described later. It is to be noted that auxiliary storage unit 120 may be configured to include a detachable storage medium such as a memory card.

Communication unit 130 is a means for communicating with base station 300. Communication unit 130 includes an antenna or the like for communicating with base station 300 wirelessly.

Display 140 is a means for displaying an image. Display 140 includes a display panel having pixels formed by liquid crystal elements or organic EL (electroluminescence) elements, and a drive circuit for driving the display panel, and displays, in display region 141, an image in accordance with image data provided from control unit 110.

Touch screen 150 is a means for receiving an operation performed by a user, and generating and supplying coordinate information that represents a position in display region 141. Touch screen 150 includes a sensor disposed to overlap display region 141, and a control circuit for generating coordinate information representing a position detected by the sensor and providing the coordinate information to control unit 110. Touch screen 150 may be of resistive type, or may be of another type such as capacitive type. Further, touch screen 150 may be a multi-touch screen, which can detect a user's touch at multiple positions at the same time. It is to be noted that a user may operate touch screen 150 with her/his finger, or by using a pen-shaped tool such as a stylus (touch pen).

Touch screen 150 provides software keys in cooperation with display 140. A software key is a key that is provided in display region 141 by a software process. Unlike a hardware key, the position of a software key is changeable, and display/hiding of a software key can be switched.

Operation unit 160 is another means for receiving an operation performed by a user. Operation unit 160 includes the aforementioned buttons 161 and slide pad 162, and provides control unit 110 with operation information in accordance with an operation performed by a user.

Motion detector 170 is a means for detecting a motion of controller 100. Motion detector 170 includes magnetic sensor 171, acceleration sensor 172, and gyro sensor 173, whereby motion detector 170 generates motion information that indicates motion of controller 100 and supplies the motion information to control unit 110. Motion information represents a change in geomagnetism (namely, direction) detected by magnetic sensor 171, a change in acceleration detected by acceleration sensor 172, and a change in angle or angular velocity (namely, tilt) detected by gyro sensor 173. It is to be noted that motion detector 170 may be configured only to include at least one of magnetic sensor 171, acceleration sensor 172, and gyro sensor 173.

Controller 100 does not move unless an operation is performed by a user, and is caused to move as a result of shaking, tilting, or another operation performed by a user. Therefore, it can be said that motion detector 170 detects a motion (or operation) of a user by detecting a motion of controller 100. Thus, in this description, the motion information generated by motion detector 170 is included in operation information.

Figure 5:
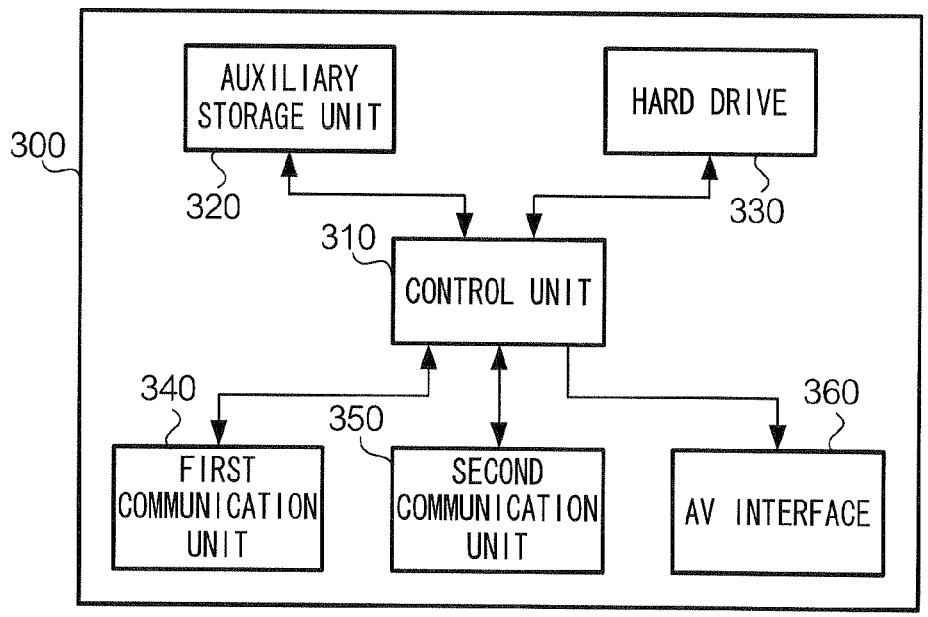
FIG. 5 is a block diagram showing an example of a non-limiting hardware configuration of a base station.

FIG. 5 is a block diagram showing a hardware configuration of base station 300. Base station 300 includes control unit 310, auxiliary storage unit 320, hard drive 330, first communication unit 340, second communication unit 350, and AV (Audio and Visual) interface 360.

Control unit 310 is a means for controlling operations of various units of base station 300, and corresponds to a "computer" in the present embodiment. Control unit 110 includes a processing device such as a CPU, a GPU (Graphics Processing Unit), a DSP (Digital Signal Processor) or the like, a memory serving as a main memory device or a VRAM (Video Random Access Memory), an input/output interface for communicating information with various units of base station 300, and so on, and executes a program(s) to control generation of image data to be transmitted to controller 100 and monitor 200. The programs that can be executed by control unit 310 include a game program, a browser program for browsing web pages, and so on, such programs being described later. Further, control unit 310 includes a codec for compressing image data to be sent to controller 100 or monitor 200 and expanding image data received from controller 100.

Auxiliary storage unit 320 is a means for storing data used by control unit 310. Auxiliary storage unit 320 is a flash memory or a hard disk, for example, but may include a detachable storage medium such as a memory card. Auxiliary storage unit 320 is capable of storing programs to be executed by control unit 310 and data acquired via first communication unit 340 or second communication unit 350.

Hard drive 330 is a means for reading data stored in an optical disk (optical storage medium). The optical disk may store data necessary for playing a game, such as a game program, for example. It is to be noted that hard drive 330 may be configured to read data stored in another storage medium such as a magneto-optical disk or a semiconductor memory.

First communication unit 340 is a means for communicating via a network such as the Internet. The communication performed by first communication unit 340 may be wired or wireless communication. First communication unit 340 receives data from an external server device or transmits data thereto in accordance with instructions from control unit 310.

Second communication unit 350 is a means for communicating with controller 100. In a case where a controller other than controller 100 is used, second communication unit 350 may communicate with the other controller. The wireless communication performed by second communication unit 350 may utilize any communication technology such as Wi-Fi (registered trademark), Bluetooth (registered trademark), or infrared communication.

AV interface 360 is a means for supplying to monitor 200 image data, sound data, or the like. AV interface 360 includes one or more interfaces such as an HDMI (High-Definition Multimedia Interface (registered trademark)) terminal or the like.

Figure 6:
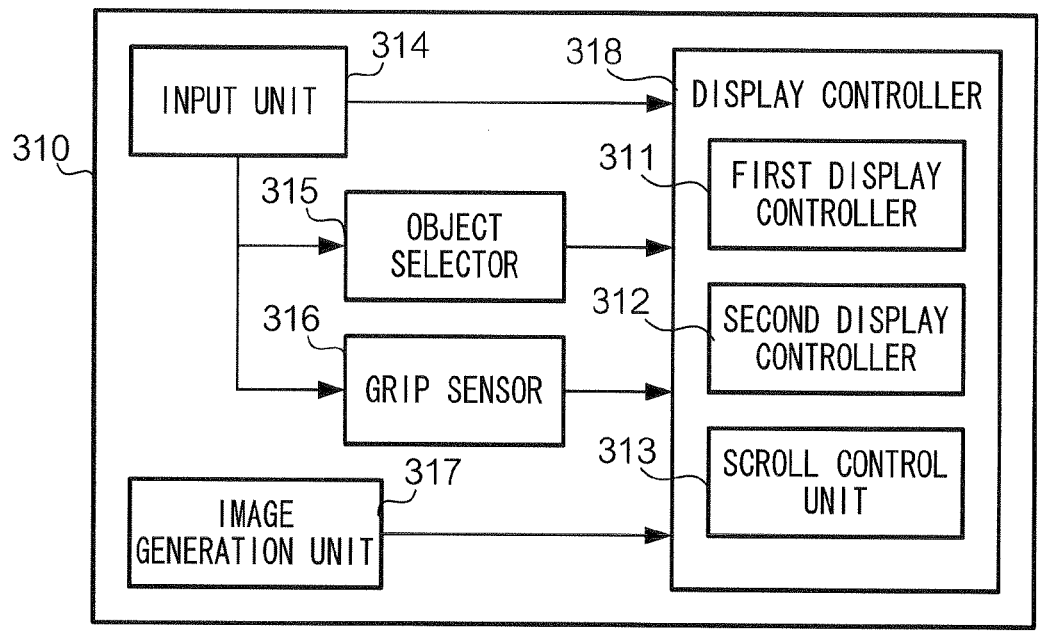
FIG. 6 is a block diagram showing an example of a non-limiting principal functional configuration of the base station.

FIG. 6 is a block diagram (functional block diagram) showing a principal functional configuration of base station 300. As means for enabling display of images on controller 100 and monitor 200, base station 300 includes first display controller 311, second display controller 312, scroll control unit 313, input unit 314, object selector 315, grip sensor 316, and image generation unit 317. The functions of these units are realized by execution of one or more programs by control unit 310 of base station 300. Namely, the functions of these units are realized by a software process(es). In the following description, first display controller 311, second display controller 312, and scroll control unit 313 may be referred to collectively as "display controller 318." Display controller 318 is a means for controlling display of images.

First display controller 311 is a means for controlling display of an image by controller 100. Particularly, first display controller 311 controls the magnification of an image displayed by controller 100. In other words, first display controller 311 controls enlarged display of an image displayed by controller 100. When an operation for displaying a magnified image (hereinafter referred to as a "magnifying operation") is performed, first display controller 311 changes the magnification of the image accordingly.

Second display controller 312 is a means for controlling display of an image by monitor 200. Second display controller 312 may cause monitor 200 to display an image different from that caused to be displayed on controller 100 by first display controller 311, though second display controller 312 may operate in cooperation with first display controller 311 such that the image displayed on controller 100 and the image displayed on monitor 200 have a prescribed relationship.

Scroll control unit 313 is a means for controlling scrolling of an image. Scrolling herein indicates a mode of display in which an image that is not displayed in its entirety in the display region is caused to move in a prescribed direction such that a portion that has not been displayed becomes visible. In the present embodiment, "scrolling" not only indicates movement of an image in an up-down direction (vertical direction) or left-right direction (horizontal direction), but also may include movement of an image in an oblique direction.

Scroll control unit 313 at least controls scrolling of an image displayed on controller 100. However, it is possible that scroll control unit 313 also controls an image displayed on monitor 200. For example, in a case where a portion of an image (e.g., a webpage) is displayed commonly on controller 100 and on monitor 200, scroll control unit 313 can cause the image displayed on monitor 200 to scroll in accordance with scrolling of the image displayed on controller 100.

Input unit 314 is a means for acquiring operation information relating to an operation performed by a user. Operation information is information transmitted from controller 100 in response to a user operation. In addition to a state of pressing of respective buttons 161, operation information may include coordinate information provided by touch screen 150 and motion information provided by motion detector 170.

Object selector 315 is a means for selecting, in accordance with an operation by a user, an object included in an image displayed in the display region. An object herein is an item to be operated, and an image such as an icon, a button used in a Graphical User Interface (GUI), a scroll bar, or a widget (also referred to as a control) such as a text box may be an object. Further, a character may function as a selectable object. For example, in a case where the image displayed in the display region is a webpage, a string of characters functioning as a hyperlink may be an object. Object selector 315 selects an object based on the operation information acquired by input unit 314.

Further, when, after an object is caused to be in a selectable state, a user performs a predetermined operation for the object in the selectable state (such as pressing of a button), object selector 315 may select the object. It is to be noted here that an object in the selectable state is an object that is given input focus.

Grip sensor 316 is a means for detecting holding of controller 100 by a user. Grip sensor 316 utilizes predetermined operation information to detect that the user is holding controller 100 in a prescribed manner. In this embodiment, when it is found that each of ZL button 161ZL and ZR button 161ZR is pressed, grip sensor 316 detects that the user is holding controller 100 with both hands, as shown in FIG. 3.

Grip sensor 316 may detect holding of controller 100 by a user based on another operation. For example, grip sensor 316 may detect holding of controller 100 by a user based on pressing of L button 161L and R button 161L instead of based on pressing of ZL button 161ZL and ZR button 161ZR, or may detect holding of controller 100 when all of these four buttons are pressed. Further, instead of detecting pressing of a hardware key, grip sensor 316 may detect holding of controller 100 by a user based on interaction with another sensor (e.g., touch sensor) by a user.

Image generation unit 317 is a means for interpreting data of a webpage (hereinafter, "page data") written in a markup language such as HTML (Hypertext Markup Language), and generating bitmap data representing the webpage. A markup language is an example of a computer language relating to the present embodiment, and page data is an example of original data relating to the present embodiment. Image generation unit 317 acquires page data via first communication unit 340, detenines an image to be displayed by, based on the page data, arranging a character(s) and an image(s) and adjusting an appearance of the character(s), and generates bitmap data that represents the determined image as a bitmap image. Namely, image generation unit 317 has principal functions as a web browser (user agent, parser, and renderer). Image generation unit 317 records the bitmap data in a VRAM. When a webpage is displayed, first display controller 311 and second display controller 312 each read out from the VRAM the bitmap data thus generated by image generation unit 317, and cause the image to be displayed.

Display controller 318 (i.e., first display controller 311, second display controller 312, and scroll control unit 313) can vary the image to be displayed in accordance with the operation information acquired by input unit 314 and/or the object selected by object selector 315. For example, in a state where a webpage is displayed on controller 100, when an object included in the webpage and indicating a certain hyperlink is selected, first display controller 311 may cause controller 100 to display another webpage indicated by the selected object.

It is to be noted that base station 300 does not have to include every unit shown in FIG. 6. For example, in a case where monitor 200 is not used for displaying images, base station 300 does not have to include second display controller 312. Further, base station 300 may realize the functions of the units shown in FIG. 6 by executing a single program or multiple programs. For example, the function of image generation unit 317 may be realized by execution of a program (browser program) that is different from the program(s) for realizing the functions of the other units.

The foregoing is a description of the configuration of display system 10. According to this configuration, base station 300 causes at least one of controller 100 and monitor 200 to display an image. Depending on a user operation and/or a type of an image to be displayed, base station 300 may cause only one of controller 100 and monitor 200 to display an image or may cause each of controller 100 and monitor 200 to display an image. It is to be noted that, in a case where an image is displayed on each of controller 100 and monitor 200, base station 300 may cause the same image to be displayed on controller 100 and monitor 200, or may cause different images to be displayed on controller 100 and monitor 200.

For example, in a case where a game is played and there are multiple users such as family members or friends, a mode of use may be assumed in which a particular user views and operates controller 100, while the other users check the progress of the game using monitor 200. In such a case, if there are multiple controllers 100 or there is a controller(s) other than controller 100, multiple users can participate in the game.

Further, by using display system 10, a user not only can play a game but also can browse web pages. Moreover, a user may browse captured images (moving images or still images) or electronic documents. In doing so, if the user wishes to view an image with another user, the user may perform an operation such that the image is displayed on each of controller 100 and monitor 200. On the other hand, if there are no other users, and the user views the image alone, it is possible to cause the image to be displayed on only one of controller 100 and monitor 200.

The following describes an operation when a webpage is viewed, as an example of display performed by display system 10. Exemplary operation 1 is an example in which an image is displayed only on controller 100, and exemplary operation 2 is an example in which an image is displayed on each of controller 100 and monitor 200.

(Exemplary Operation 1)

Figure 7:
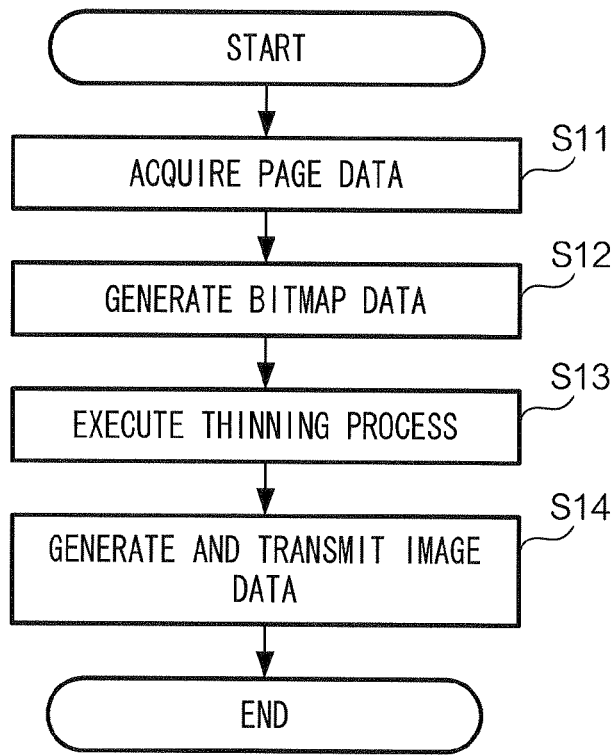
FIG. 7 is a flowchart showing an example of a non-limiting process executed by the base station.

FIG. 7 is a flowchart showing a basic process executed by base station 300 when causing controller 100 to display an image of a webpage. According to this process, base station 300 first acquires page data in accordance with an operation performed by a user (step S11). For example, when a user presses a certain key, control unit 310 reads out a URL (Uniform Resource Locator) of a preset webpage, and acquires, via first communication unit 340, the resources (HTML data, style sheet, image data, script, etc.) indicated by the URL. Namely, page data refers to a collection of resources necessary to display a webpage.

Upon receipt of the page data, control unit 310 generates bitmap data based on the page data (step S12). Control unit 310 executes a process such as rendering to generate bitmap data, and stores the bitmap data temporarily in VRAM.

Subsequently, control unit 310 executes predetermined image processing on the bitmap data (step S13). Predetermined image processing here refers to image processing for displaying an image in accordance with the size of display region 141 of controller 100. In this exemplary embodiment, control unit 310 performs a thinning process in which pixels constituting the bitmap data are thinned out to reduce the number of pixels. This thinning process may be performed by use of any known thinning technique. For example, control unit 310 may reduce the number of pixels in each of the vertical direction and the horizontal direction to ½ (1/n), so that the total number of pixels is reduced to ¼ ($1/n^2$).

Then, control unit 310 generates image data based on the bitmap data after the thinning process has been performed, and transmits the image data to controller 100 via second communication unit 350 (step S14). Image data is data of an image and is obtained by compressing the bitmap data using a predetermined compressing technique. It is to be noted, however, that if the communication speed is sufficiently high relative to the capacity of the image data, the compressing process may be omitted. Further, the image data may include an image corresponding to an object, which will be described later. Upon receipt of the image data, control unit 110 of controller 100 causes a corresponding image of a webpage (hereinafter referred to as a webpage image) to be displayed in display region 141.

Figure 8:
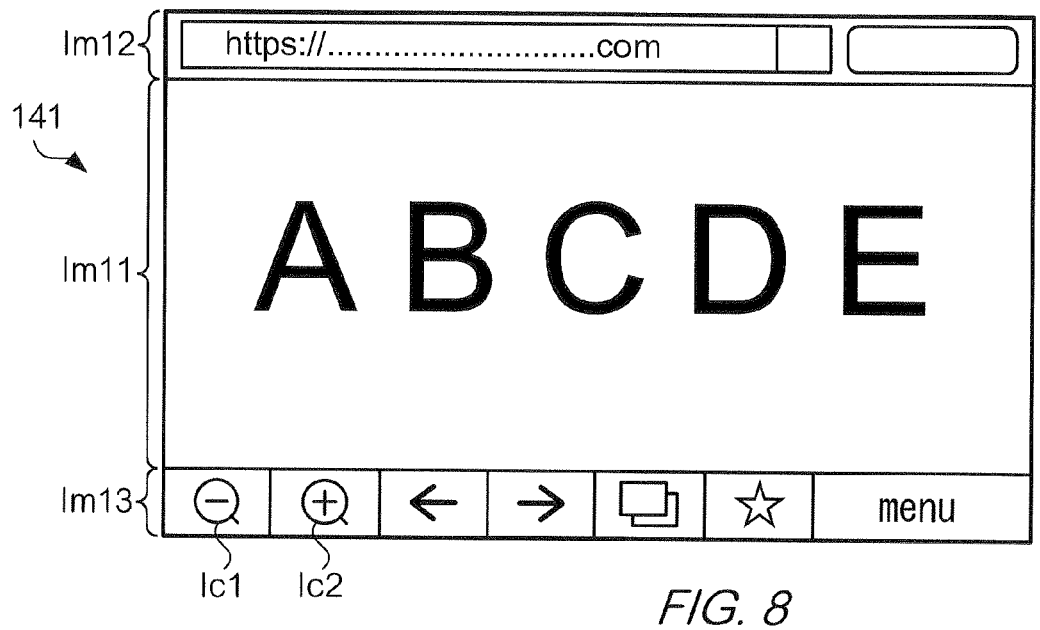
FIG. 8 is a diagram showing an example of a non-limiting exemplary image displayed on the controller.

FIG. 8 is a diagram showing an exemplary image displayed on controller 100. In this example, controller 100 displays menu images Im12 and Im13 in addition to webpage image Im11. Menu images Im12 and Im13 are images for displaying the URL of the displayed webpage and a textbox for enabling search using a search engine, for example. Further, menu images Im12 and Im13 each include an object, which is an object selectable by a user by performing an operation on display region 141 (touch operation). According to this embodiment, the objects include at least reduce icon Ic1, which is an icon for reducing webpage image Im11, and magnify icon Ic2, which is an icon for magnifying image Im11, though the objects may include, for example, an icon for displaying a bookmark(s) (URL of one or more pre-registered favorites) or an icon for causing the displayed webpage to go back to the previously displayed page, etc.

It is to be noted that the number and arrangement of objects are not particularly limited. For example, instead of being arranged at the top and the bottom as menu images Im12 and Im13, objects may be arranged on the left and right, or may be displayed together either at the top, at the bottom, on the left, or on the right. Further, display of an object is not mandatory.

In the following description, to distinguish from a magnified image, which will be described later, an image as shown in FIG. 8 (i.e., an image before magnifying) will be referred to as a "normal-sized image." A normal-sized image is an example of an image relating to the present embodiment and an image that is displayed with a "first magnification."

A user can magnify and display a part of a normal-sized image by operating controller 100 displaying the normal-sized image. In this embodiment, there are two modes for magnifying the displayed image. In the first mode, when a predetermined key is pressed, the image is magnified and displayed with a predetermined magnification only while the key is pressed, and if the pressing of the key is terminated, the displayed image reverts to the normal-size image. This mode can be achieved by switching permission and prevention of execution of the thinning process. On the other hand, in the second mode, magnification (or reduction) is performed in steps, according to the number of pressing operations of the predetermined key. The second mode is designed to enable setting of the magnification more precisely than in the first mode.

In the following description, magnification or reduction in the first mode will be referred to as "quick zoom," and magnification or reduction in the second mode will be referred to as "step zoom." In this embodiment, quick zoom is carried out in response to pressing of Y button 161Y, while step zoom is carried out in response to pressing of reduce icon Ic1 or magnify icon Ic2. It is to be noted that these keys (hardware keys and software keys) are merely given as examples, and the keys for performing magnification or reduction may be other keys. For example, quick zoom may be performed in response to pressing of L button 161L or R button 161R, or may be performed in response to pressing of a predetermined icon (namely, a software key) provided in display region 141.

Figure 9:
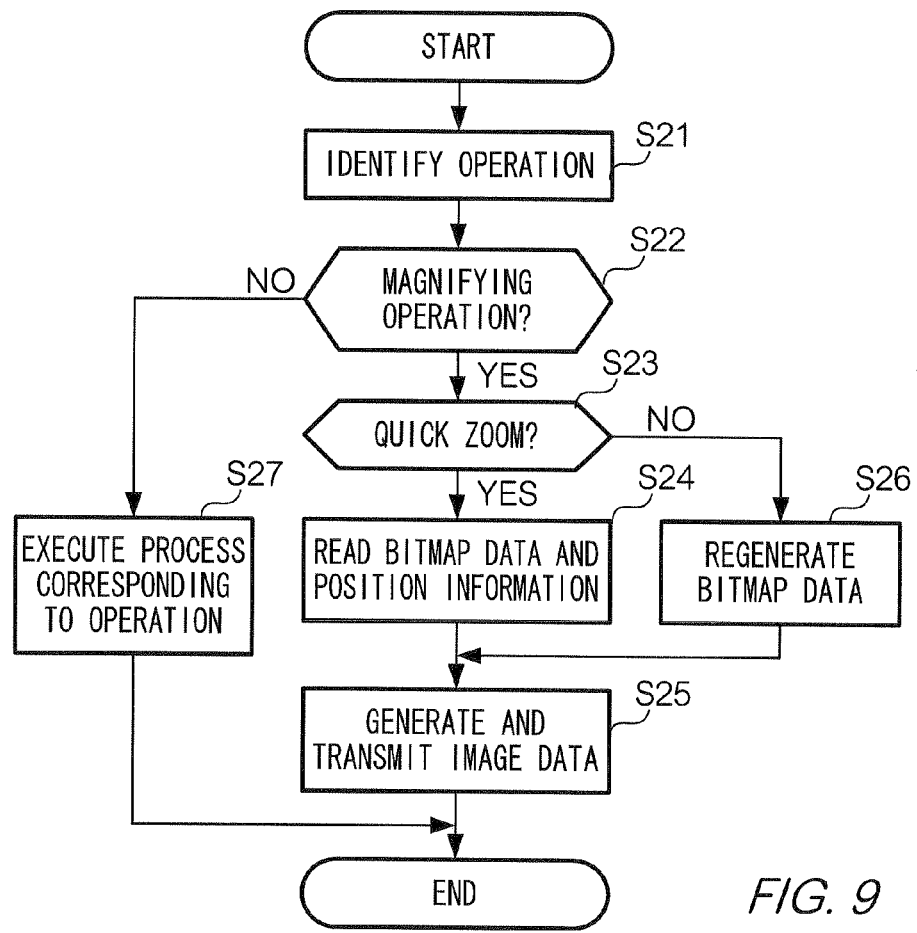
FIG. 9 is a flowchart showing an example of a non-limiting interruption process including a magnifying process.

FIG. 9 is a flowchart showing an interruption process including a magnifying process. The process shown in FIG. 9 is an interruption process executed when a user operation is performed (i.e., operation information is acquired) in a state where a normal-sized image is displayed. It is to be noted that, though user operations may include operations other than a magnifying operation for magnifying and displaying a normal-sized image, explanation here will be given mainly of the process executed when the magnifying operation is performed, and explanation of the other processes may be omitted appropriately.

Upon acquisition of operation information, control unit 310 of base station 300 identifies the operation indicated by the operation information (step S21). Then, control unit 310 determines whether the identified user's operation is a magnifying operation (step S22). If the identified operation is not a magnifying operation, control unit 310 executes a process corresponding to the identified operation (step S27). The process in step S27 may be a process of switching the displayed normal-sized image page-by-page, for example.

Further, if the identified operation is a magnifying operation, control unit 310 executes different processes depending on the operation. Specifically, control unit 310 determines whether the magnifying operation is an operation for conducting quick zoom (i.e., operation of Y button 161Y) (step S23), and executes a process in accordance with the result of the determination.

If it is determined that an operation for quick zoom is performed, control unit 310 reads bitmap data that is stored in VRAM and that has not been subjected to the thinning process yet, together with position information representing a position of a portion of a normal-sized image to be magnified and displayed (step S24), and, based on these data, generates image data and transmits the same (step S25). The process of step S25 is carried out in a manner similar to that of step S14, but differs in the point that the process of step S25 utilizes the position information.

Position information is information indicating which part of a normal-sized image is to be magnified and displayed, and its initial value indicates a predetermined position (hereinafter, "initial position"). The initial position herein is a center of a normal-sized image, though it may be an end portion of a normal-sized image (e.g. an upper left end portion) or the like. As will be described later, position information is changed as a result of scrolling of an image. Position information is indicated by the coordinate of each of the vertices of a quadrangle corresponding to display region 141, for example, though it may be indicated by the coordinate of a specific vertex representing the vertices.

On the other hand, if it is determined that an operation for step zoom is performed, control unit 310 regenerates bitmap data in accordance with a magnification by which the image is to be magnified (step S26). Namely, control unit 310 again executes processes, such as rendering, based on the page data. Then, based on the regenerated bitmap data, control unit 310 generates image data and transmits the same (step S25).

Figure 10:
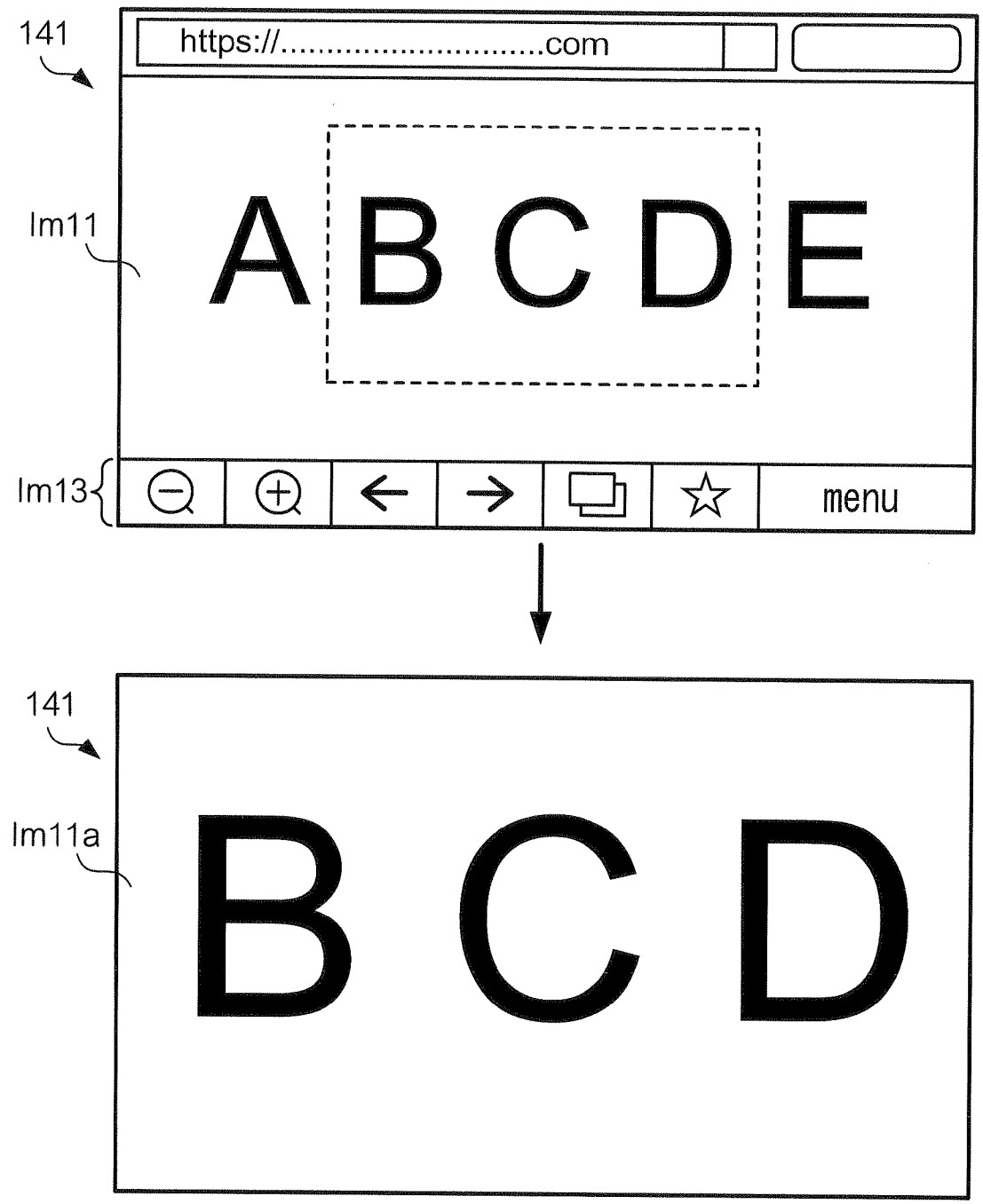
FIG. 10 is a diagram showing an example of a non-limiting image displayed when quick zoom is performed.

FIG. 10 is a diagram showing an exemplary image displayed when quick zoom is performed. FIG. 10 shows an image obtained when image Im11 shown in FIG. 8 is magnified and displayed. In the following description, image Im11a displayed at this time, i.e., an image obtained by magnifying a part of the normal-sized image, will be referred to as a "magnified image." A magnified image is an example of a partial image in the present embodiment. In this embodiment, a magnified image is displayed at four times the size of a normal-sized image. It is to be noted that the rectangle shown by broken lines in FIG. 10 is a rectangle one quarter the size of display region 141, and is shown for reference.

When a magnified image is displayed, it is possible, as shown in FIG. 10, not to display menu images Im12 and Im13 shown in FIG. 8 (of course, it is also possible to display the menu images). By not displaying an object(s), a user can view the magnified image without a view being hindered by the object(s). It is considered that magnification of an image is performed mainly when a user wishes to view the image in more detail. Therefore, in such a case, it may be preferred that images other than the desired image are not displayed. Further, in a case where an object(s) is not displayed when a magnified image is displayed, an amount of information displayed on the screen can be increased as compared to the case where the object(s) is displayed, which is convenient for a user. Particularly, in this embodiment, since the key for performing quick zoom is a hardware key and not a software key, it is possible not to display the objects at all when displaying a magnified image.

The mode of display when step zoom is performed is similar to that when quick zoom is performed. However, in the case where step zoom is performed, reduce icon Ic1 and magnify icon Ic2 may continue to be displayed. Further, it is preferred that the magnifications that can be adopted when step zoom is performed include magnifications other than the magnification for performing quick zoom (four times the normal-sized image); for example, magnifications smaller than the magnification for quick zoom (1.2 times, 1.5 times, 2 times, etc.). These magnifications correspond to a "third magnification" of the present embodiment.

Since the magnified image is displayed as described in the foregoing, a user can view the magnified image in two ways. In the case where quick zoom is used, it is not necessary to execute processes for generating bitmap data (such as rendering), and therefore, it is possible to reduce the time required for displaying the image or the load on the hardware resources, as compared to the case where step zoom is used. On the other hand, when step zoom is used, a magnified image with a magnification not relying upon the number of pixels of the normal-sized image can be displayed.

Further, in the case where quick zoom is used, the magnified image is displayed in place of the normal-sized image only while the magnifying operation is performed, i.e., only while Y button 161Y is pressed, and upon termination of the magnifying operation, the normal-sized image is displayed in place of the magnified image. In this way, it is possible to display the magnified image only when the user needs the magnified image, and it becomes unnecessary to display the normal-sized and magnified images simultaneously. Therefore, it is possible to use the size of display region 141 efficiently to display the magnified image.

Furthermore, in this embodiment, it is possible to display a magnified image without requiring multiple presses or a long press of Y button 161Y, and hence, the time required for starting display of a magnified image can be reduced, as compared to the case where these operations are required for performing magnified display. Thus, combined with the feature of not requiring processes such as rendering, quick zoom of the present embodiment can achieve quick display of the magnified image. Further, the combination of quick zoom and step zoom allows a user to use selectively quick display of a magnified image and display of a magnified image with a smaller magnification.

Figure 11:
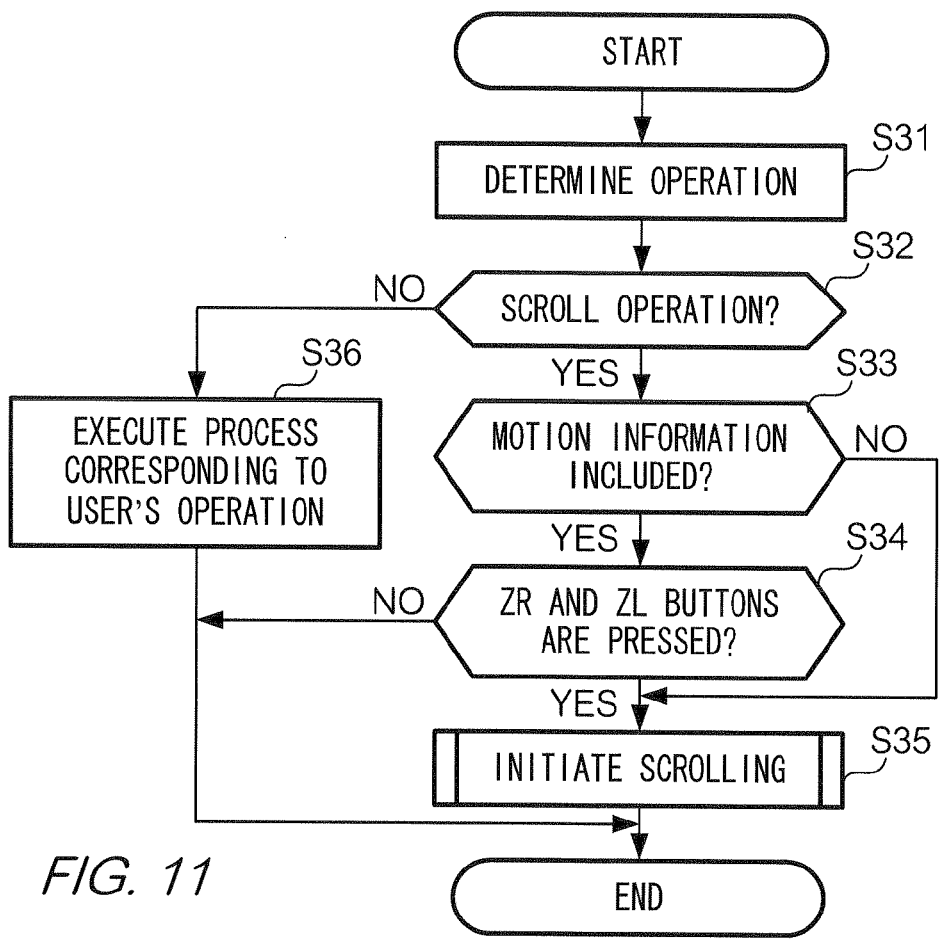
FIG. 11 is a flowchart showing an example of a non-limiting exemplary interruption process including a scrolling process.

FIG. 11 is a flowchart showing an interruption process including a scrolling process. The process shown in FIG. 11 is an interruption process executed upon acquisition of operation information when a user performs an operation in a state where a normal-sized image or a magnified image is displayed. Specifically, FIG. 11 shows a process where an operation for scrolling an image (hereinafter, "scroll operation") is performed as the user operation. The process shown in FIG. 11 may be incorporated into the process shown in FIG. 9, such that they are executed simultaneously in parallel.

In this embodiment, the scroll operation can be achieved by the following three ways of operation; the first operation is a touch operation on display region 141, the second operation is an operation using slide pad 162, and the third operation is an operation of moving controller 100. The third operation is processed, for example, in such a manner that, when a user moves controller 100 leftward, the image displayed in display region 141 is caused to move rightward so that the left-hand image that has been hidden comes into view. It is to be noted that the third operation may include scrolling of an image in response to inclination of controller 100 or varying an amount of scroll of an image in accordance with the velocity and/or acceleration given to controller 100.

It is also to be noted that the scroll operation does not have to be achieved by three ways of operation, and may be achieved by only one or two ways. Further, if there are multiple ways of scroll operation, it is preferred that an order of priority of operations should be predetermined to avoid conflict between operations. In the present embodiment, the operation information of a touch operation on display region 141 is given top priority (i.e., the highest priority), and the motion information is given the lowest priority. In this case, when control unit 310 acquires the operation information of a touch operation and the motion information, control unit 310 processes the former with priority. For example, if the operation information of a touch operation indicates leftward scrolling while the motion information indicates rightward scrolling, control unit 310 determines that leftward scrolling should be performed.

Upon acquisition of operation information, control unit 310 of base station 300 identifies the operation indicated by the operation information (step S31). This step is performed in a manner similar to that in step S21 shown in FIG. 9. Subsequently, control unit 310 determines whether the identified operation is a scroll operation (step S32). In doing so, control unit 310 determines whether one of the aforementioned first to third operations is performed.

If it is determined that an operation other than the scroll operation is performed, control unit 310 executes a process corresponding to this operation (step S36). The process executed in step S36 may include the process executed when the magnifying operation is performed (see FIG. 9), for example, or may include another process. Since these processes are not directly relevant to scrolling of the screen, explanation thereof is omitted here.

If the identified operation is a scroll operation, control unit 310 determines the type of scroll operation. Specifically, control unit 310 determines whether the acquired operation information includes the motion information generated by motion detector 170 (step S33). If the operation information includes the motion information, control unit 310 determines further whether the operation information includes operation information indicating that ZL button 161 ZL and ZR button 161 ZR are pressed (step S34).

It is to be noted that, instead of the process of step S34, or in addition to the process of step S34, control unit 310 may determine whether the amount of motion (amount of movement, extent of inclination) indicated by the acquired motion information is equal to or greater than a predetermined amount, and may proceed to the process of step S35 if the amount of motion is equal to or greater than the predetermined amount. Namely, an operation of pressing ZL button 161ZL and ZR button 161ZR may be dispensable.

Control unit 310 executes a scroll process in the case where the operation information does not include motion information or in the case where the operation information includes motion information and ZL button 161ZL and ZR button 161ZR are pressed (step S35). On the other hand, in the case where the operation information includes motion information but ZL button 161ZL or ZR button 161ZR is not pressed, control unit 310 does not perform the scroll process, and disregards the motion information. Namely, in this embodiment, the scroll operation indicated by the motion information is made effective by pressing of ZL button 161ZL and ZR button 161ZR, and is ineffective if these buttons are not pressed.

Figure 12:
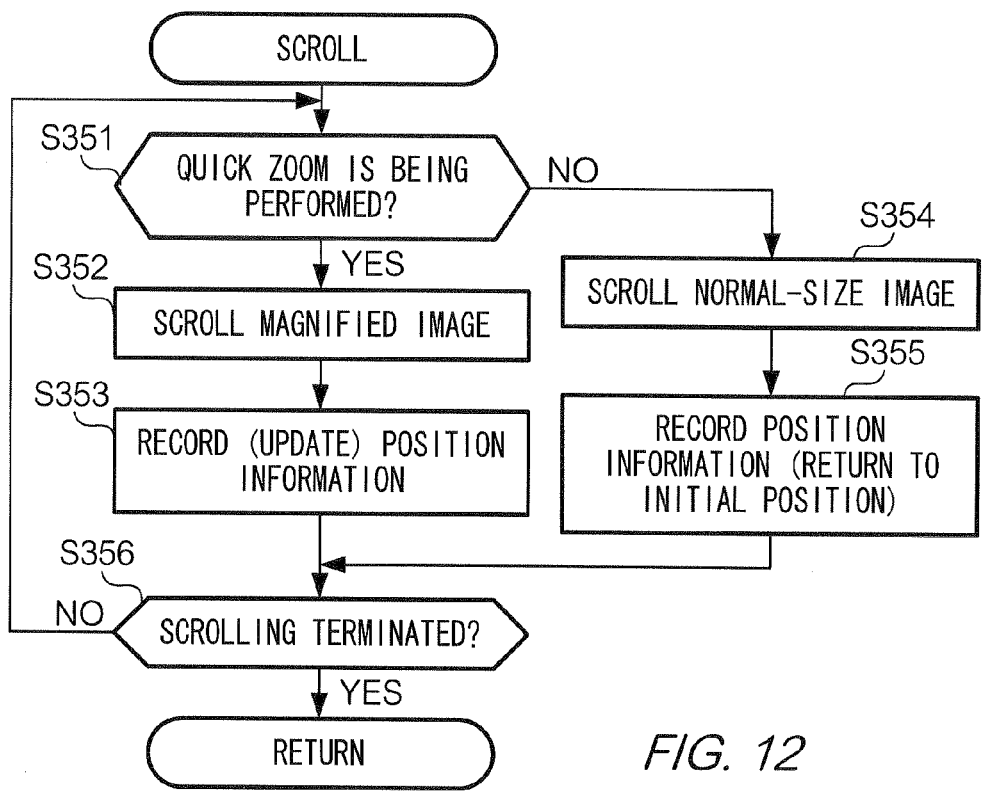
FIG. 12 is a flowchart showing an example of a non-limiting scroll process included in the scrolling process.

FIG. 12 is a flowchart showing the scroll process in step S35 in detail. In this scroll process, control unit 310 first determines whether quick zoom is being performed by the user (step S351), and executes different processes depending on a result of this determination. Control unit 310 makes this determination by determining whether Y button 161Y is pressed.

If it is determined that quick zoom is being performed, control unit 310 causes the currently displayed magnified image to be scrolled in accordance with the scroll operation performed by the user (step S352). Then, control unit 310 updates the recorded position information in accordance with movement of the magnified image resulting from the scrolling (step S353). Specifically, control unit 310 records, as the position information, the position of the displayed magnified image in the normal-sized image.

It is to be noted that the position information recorded in step S353 will be read out in the aforementioned step S24 when an operation for quick zoom is performed again. In this way, control unit 310 retains the display position of the magnified image when the magnifying operation is terminated (i.e., when the operation for quick zoom is terminated), so that when the magnifying operation is performed again without the scroll operation being performed after the retention of the display position, the magnified image at the previous display position can be displayed.

On the other hand, if it is determined that quick zoom is not being performed, control unit 310 causes the currently displayed normal-sized image to be scrolled in accordance with the scroll operation performed by the user (step S354). When the display of the normal-sized image itself is changed, control unit 310 changes the position information, such that the position of the magnified image returns to the predetermined initial position (step S355). The initial position is a central portion of the currently displayed normal-sized image, for example. Therefore, the initial position changes in accordance with the scrolling of the normal-sized image. Namely, relative to the currently displayed normal-sized image, the initial position is a fixed position, but relative to the whole of the normal-sized image (including the portion not displayed currently), the initial position is not necessarily a fixed position. For this reason, control unit 310 records the display information position as a coordinate in the normal-sized image.

After causing the normal-sized image or the magnified image to scroll as described in the foregoing, control unit 310 determines whether the scroll operation is terminated (step S356), and repeats the process from step S351 to S355 until the scroll operation is terminated. It is to be noted that, as is obvious from the description in FIG. 12, the user may start or terminate the magnifying operation during this repetition of the process.

Figure 13:
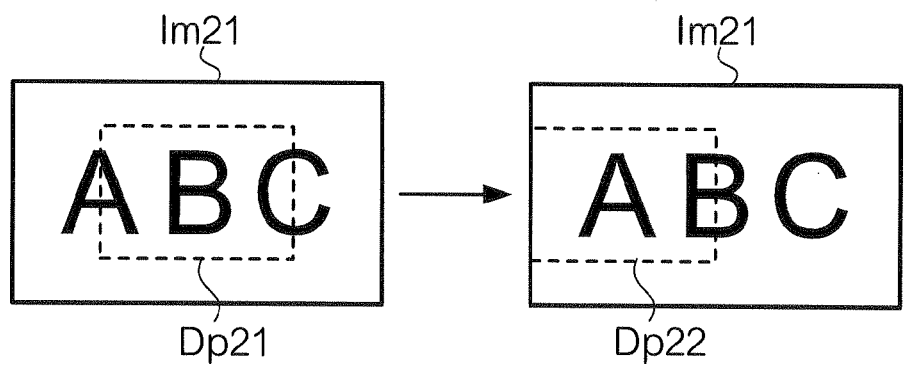
FIG. 13 is a diagram showing an example of a non-limiting change of position information.
Figure 14:
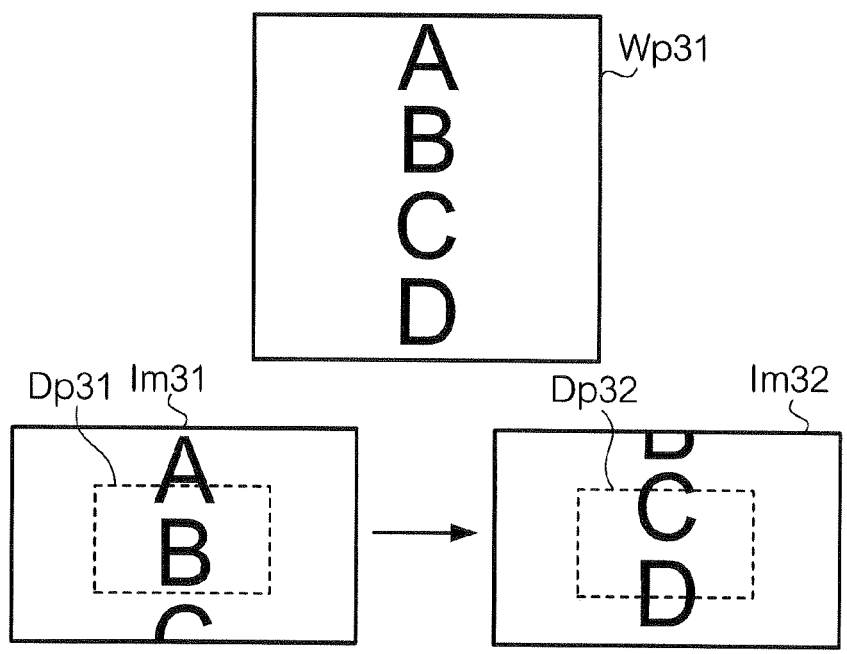
FIG. 14 is a diagram showing an example of a non-limiting change of position information.

Each of FIGS. 13 and 14 is a diagram showing an example of a change of position information resulting from scrolling, as described in the foregoing. FIG. 13 shows a change of position information in the case where scrolling in the horizontal direction is performed while a magnified image is displayed (i.e., while quick zoom is performed). FIG. 14 shows a change of position information in the case where scrolling in the vertical direction is performed while a normal-sized image is displayed. It is to be noted that in the example of FIG. 14, it is assumed that the displayed webpage is long in the vertical direction, and only a part of the webpage is displayed in display region 141.

In FIG. 13, image Im21 represents a normal-sized image. In this case, this means that, before a magnifying operation is performed, image Im21 is displayed in display region 141. Display positions Dp21 and Dp22 represent positions of the magnified image before and after scrolling, respectively. For example, in the state where the magnified image corresponding to display position Dp21 is displayed, when the user performs an operation for scrolling the image leftward, the display position of the magnified image is changed from display position Dp21 to display position Dp22. Control unit 310 records the items of position information representing these display positions. Namely, control unit 310 records the position information representing display position Dp21 before the leftward scroll operation, and records the position information representing display position Dp22 after the scroll operation.

On the other hand, in FIG. 14, webpage Wp31 represents an entire webpage (one page). In this example, image Im31 represents a normal-sized image displayed prior to the scroll operation, and image Im32 represents a normal-sized image displayed after the scroll operation. Provided that the magnifying operation is not performed and the initial display position is the center of a normal-sized image, the display position is represented by display position Dp31 in image Im31, and by display position Dp32 in image Im32. Namely, in response to the scroll operation, control unit 310 changes the position information such that only the position of the part to be magnified in the webpage changes but the position of the same relative to the normal-sized image does not change. In this case, if the user performs the magnifying operation before the scroll operation, a magnified image corresponding to display position Dp31 is displayed in display region 141, and if the user performs the magnifying operation after the scroll operation, a magnified image corresponding to display position Dp32 is displayed in display region 141.

Since the scroll operation in this embodiment is performed as an operation independent of the magnifying operation, it is possible, for example, to start the magnifying operation while the scroll operation is performed, or to start the scroll operation while the magnifying operation is performed. Thus, the user can perform one of the two operations as necessary, irrespective of whether the other is being performed.

Further, the scroll operation of this embodiment requires pressing of ZL button 161ZL and ZR button 161ZR for the motion information generated by the motion detector 170 to be effective as the operation information indicating the scroll operation. Namely, ZL button 161ZL and ZR button 161ZR function as switches that can be pressed in this case, and only when the switches are on (pressed), scrolling of an image is carried out. As is described in the foregoing, when ZL button 161ZL and ZR button 161ZR are pressed using both hands, the user can hold controller 100 firmly, and thus, more precise motion information is acquired.

For example, if the user is allowed to operate controller 100 using only one hand, controller 100 tends to make an unintended motion (motion different from that intended for the scroll operation), and it becomes difficult to distinguish between the unintended motion and the motion for the scroll operation, which increases a possibility that unintended scrolling of an image is performed by the user. In contrast, if a rule is applied that requires the user to press ZL button 161ZL and ZR button 161ZR when the scroll operation is performed, the user is prompted to hold controller 100 in a preferred way (see FIG. 3), and therefore, it can be expected that the possibility of erroneous detection of scroll operation by base station 300 will be reduced, as compared to the case where such a rule is not applied. It is to be noted that such an effect can also be achieved by requiring pressing of L button 161L and R button 161R instead of requiring pressing of ZL button 161ZL and ZR button 161ZR.

(Exemplary Operation 2)

Unlike the aforementioned Exemplary Operation 1, an image is displayed on each of controller 100 and monitor 200 in this exemplary operation. However, the operation of controller 100 is basically the same as in Exemplary Operation 1. Therefore, in this exemplary operation, explanation of the operation of controller 100 will be omitted as appropriate.

Figure 15A:
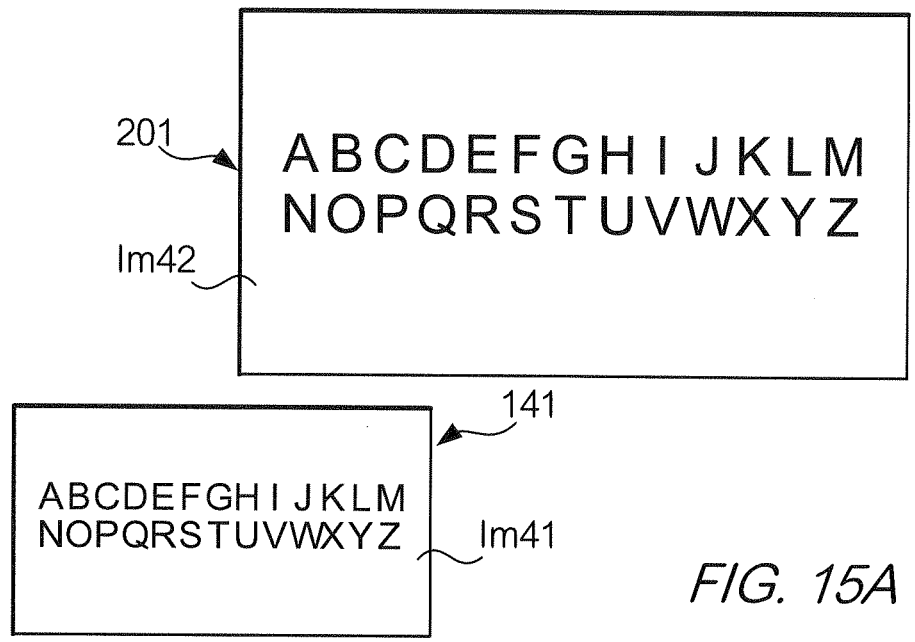
FIGS. 15A are 15B are diagrams showing examples of non-limiting images displayed on a controller and on a monitor.
Figure 15B:
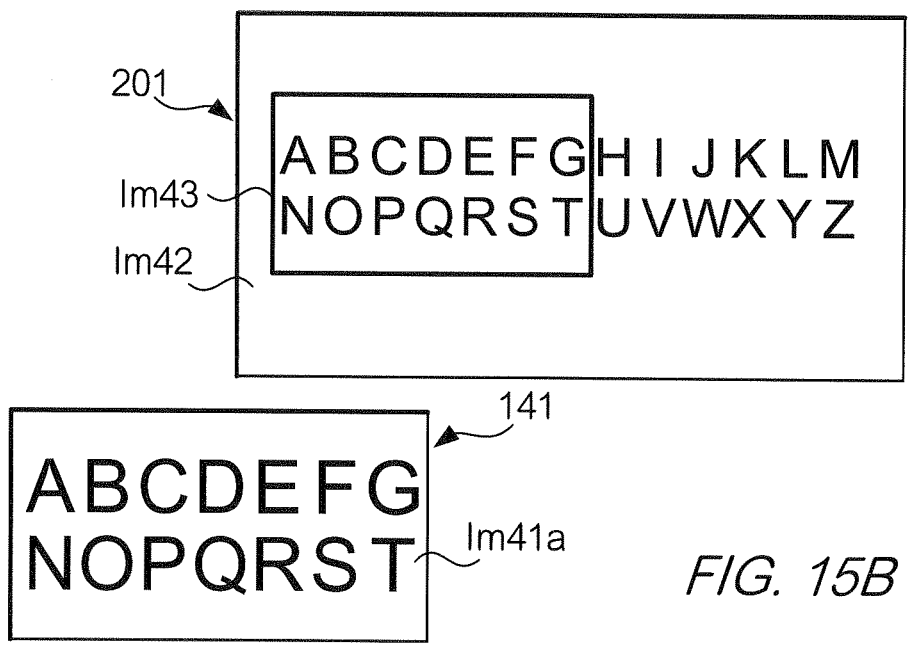

FIG. 15 is a diagram showing exemplary images displayed in display region 141 of controller 100 and display region 201 of monitor 200. In this example, controller 100 and monitor 200 each display an image of the same webpage. FIG. 15A shows the state where image Im41 (normal-sized image) is displayed in display region 141 of controller 100, and FIG. 15B shows the state where image Im41a (magnified image), which is obtained by magnifying image Im41, is displayed in display region 141 of controller 100. It is to be noted that image Im42 is an image on which the thinning process has not been performed, while image Im41 is an image on which the thinning process has been performed.

When a magnified image is displayed on controller 100, monitor 200 displays image Im43 of a frame (hereinafter referred to as a frame image) in addition to webpage image Im42. Frame image Im43 is an image representing the display position of the magnified image displayed on controller 100, and an image that serves as an indicator of the magnified image displayed on controller 100. In this example, frame image Im43 is displayed only while the magnifying operation is performed. By viewing frame image Im43, the user can know at which position in the entire webpage the displayed magnified image is located. Frame image Im43 is an example of an "indicator image" of the embodiment. It is to be noted that, instead of frame image Im43, it is possible to use, as the indicator image, an image showing the area displayed on controller 100 with one or more dots, or an image that changes the color within the area from that of another area (e.g., an image highlighting the area or an image causing the area to flicker).

Figure 16:
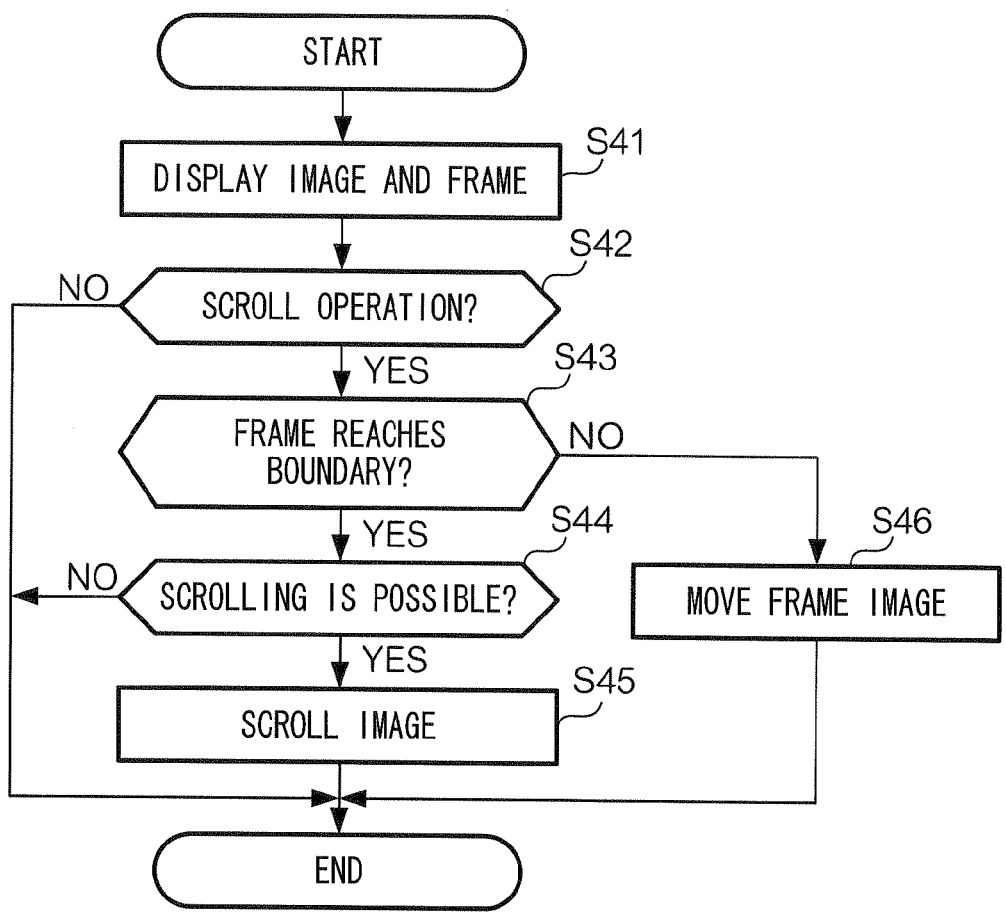
FIG. 16 is a flowchart showing an example of a non-limiting a process executed by the base station.

FIG. 16 is a flowchart showing a process executed by base station 300 when causing monitor 200 to display the frame image. This process is executed by base station 300 in parallel with the process for causing controller 100 to display an image (see FIG. 9), when the magnifying operation is performed. Namely, base station 300 causes monitor 200 to display an image, while causing controller 100 to display an image simultaneously.

In this process, control unit 310 of base station 300 first causes a webpage image and a frame image to be displayed (step S41). Since control unit 310 also conducts control for displaying an image on controller 100, control unit 310 can specify the position of the image displayed on controller 100. Controller 310 specifies the position of the frame image by specifying the position of the image displayed on controller 100.

Then, control unit 310 determines whether a scroll operation is performed via controller 100 (step S42). If it is found that the scroll operation is not performed, control unit 310 terminates the process without causing the image to scroll. On the other hand, if it is found that the scroll operation is performed, control unit 310 determines whether the frame image has reached the boundary of display region 201 in the direction in which the scroll operation is performed (step S43).

When the frame image has reached the boundary of display region 201, control unit 310 determines whether scrolling is possible in the direction in which the scroll operation is performed (step S44). If further scrolling is not possible, such as when an end portion of the webpage is displayed in the display region 201, control unit 310 terminates the process without causing the image to scroll. In this case, control unit 310 may cause monitor 200 to show a predetermined display indicating that further scrolling is impossible, or may provide a notification by means of voice (alarm sound) or by any other means. On the other hand, if further scrolling is possible, control unit 310 causes the image displayed on monitor 200 to scroll in the direction in which the scroll operation is performed, so that the displayed image changes (step S45).

Further, if the frame image has not reached the boundary of display region 201, control unit 310 causes the display position of the frame image to move without causing the image displayed on monitor 200 to scroll (step S46). It is to be noted, however, that in this case also, scrolling of the image displayed on controller 100 is performed.

FIG. 17 is a diagram showing exemplary screen transitions on monitor 200 in this exemplary operation. In this example, monitor 200 displays image Im51 of a webpage that is longer in the vertical direction than display region 201. In this drawing, the part of the webpage that is not displayed in display region 201 is shown by broken lines.

Figure 17A:
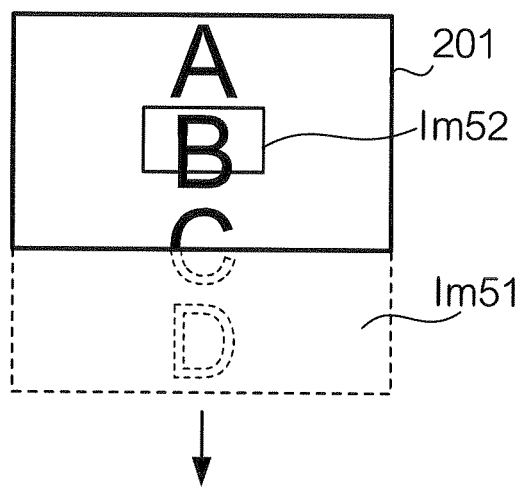
FIGS. 17A though 17C are diagrams showing examples of non-limiting transitions of images on a screen.

In the state shown in FIG. 17A, frame image Im52 is displayed at the center of display region 201. If, in this state, the user performs a scroll operation for downward scrolling, base station 300 causes the display position of frame image Im52 to move downward. At this time, base station 300 causes the image displayed in display region 141 of controller 100 to scroll in accordance with the movement of frame image Im52. If such a scroll operation is performed continuously, frame image Im52 will eventually reach the boundary of display region 201, as shown in FIG. 17B.

Figure 17B:
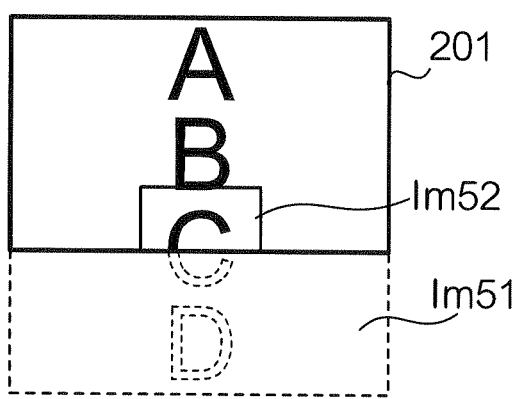
Figure 17C:
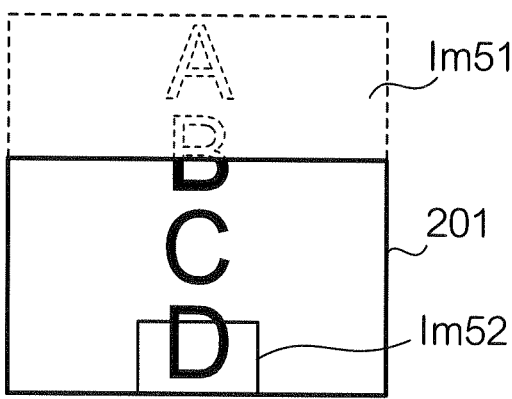

In the state shown in FIG. 17B where frame image Im52 has reached the boundary of display region 201, if a scroll operation for further downward scrolling is performed, base station 300 causes scrolling to start, so that the part of webpage image Im51 displayed in display region 201 changes. As a result of this, the part of image Im51 that has not thus far been displayed comes into view gradually. Thereafter, if the downward scroll operation is repeated and the lower end of the webpage has come into view, as shown in FIG. 17C, no further scrolling is performed.

In this exemplary operation, the user can cause the image displayed on monitor 200 to scroll as required, by performing a scroll operation for scrolling the image displayed on controller 100. Further, the user can see the part of the image that is not displayed in display region 141 of controller 100 by viewing the display region 201 of monitor 200, and can know the positional relationship between the image displayed in display region 201 and the image displayed in display region 141 by referring to the frame image.

Modifications

The exemplary embodiment described in the foregoing is one embodiment for carrying out the present embodiment. The present embodiment is not limited to the exemplary embodiment, and can be carried out in other embodiments, as shown by the following modifications. It is to be noted that multiple modifications may be combined as required in carrying out the embodiment.

Modification 1

In the state where a normal-sized or magnified image is displayed in display region 141, the user can select an object displayed in display region 141. In other words, base station 300 can receive an operation for selecting an object in each of the state where the magnifying operation is being performed and the state where the magnifying operation is not being performed. The user may select an object by touching display region 141, though the user may select an object by performing another operation. For example, D-pad 161D and A button 161A of controller 100 may be used as keys for selecting an object.

As a method for selecting an object using D-pad 161D and A button 161A, for example, D-pad 161D is used to switch a selection candidate among the objects, and A button 161A is used to select the selection candidate (namely, to confirm the object to be selected).

Figure 18A:
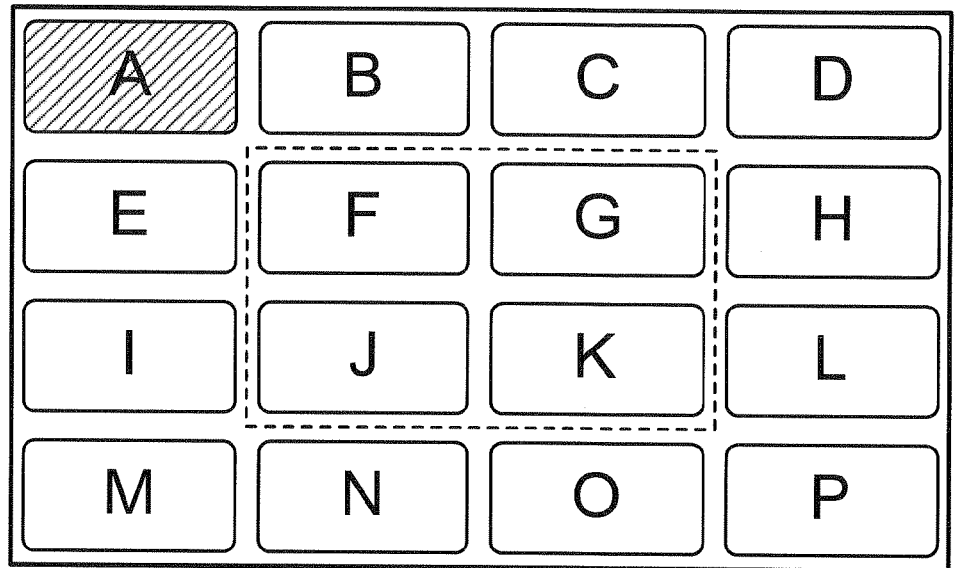
FIGS. 18A and 18B are diagrams showing examples of non-limiting objects and selection candidates thereof.
Figure 18B:
Figure 18B:
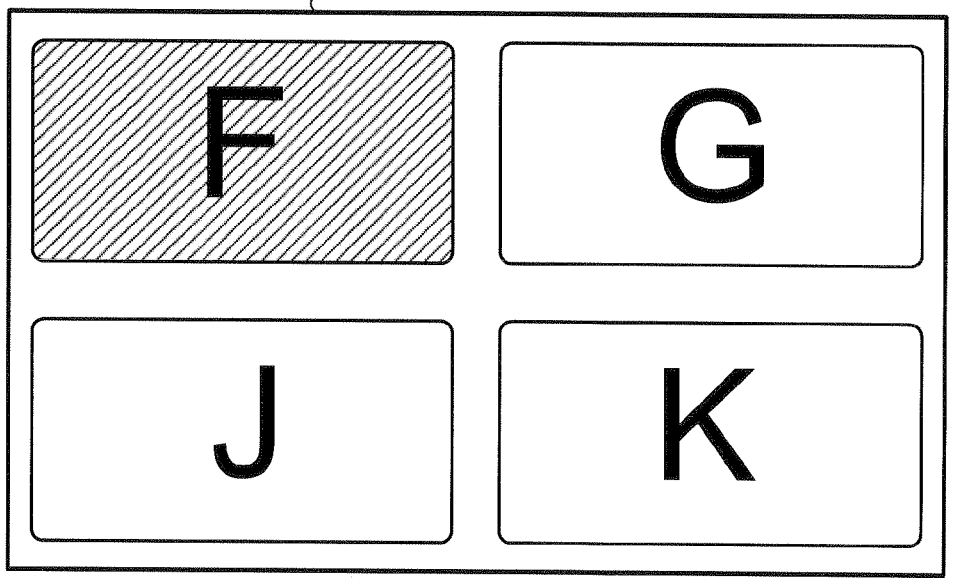

FIG. 18 is a diagram showing exemplary objects displayed in each of a normal-size image and a magnified image, and selection candidates thereof. In this drawing, each image denoted by one of the letters A-P is a selectable icon, and thus, an object. In this example, upon pressing of D-pad 161D by the user, one of the objects is designated as the selection candidate following a predetermined rule. For example, as shown in the drawing, the upper left object in the display region 141 is designated as the first selection candidate. Thereafter, the user can move the selection candidate in the vertical and horizontal directions by using D-pad 161D. For example, in the state shown in FIG. 18A, if the user instructs to move right once by using D-pad 161D, the selection candidate is switched from icon "A" to icon "B."

On the other hand, FIG. 18B shows magnified image Im62 derived from normal-size image Im61 shown in FIG. 18A. When this magnified image Im62 is displayed, the icon designated as the first selection candidate is icon "F."

As is described in the foregoing, in the case where the magnifying operation is performed the first selection candidate may be different from that in the case where the magnifying operation is not performed. Further, a number of objects that can be selected may also be different. Therefore, in some cases, by performing the magnifying operation to cause a magnified image to be displayed, the user can select a desired object by carrying out fewer operations. For example, the minimum number of pressing operations of D-pad 161D required for selecting icon "K" when the magnified image is displayed as shown in FIG. 18B, is smaller than that when the normal-size image is displayed as shown in FIG. 18A, and therefore, in this case, it is preferable to perform the magnifying operation before operating D-pad 161D. On the other hand, in cases such as when availability of information at a glance is desired or when a desired object has not been determined, operating D-pad 161D without performing the magnifying operation may be preferred.

In this example, D-pad 161D may also be used for performing the scroll operation. For example, it is possible that, when the user instructs "upward" using D-pad 161D in the state shown in FIG. 18B, magnified image Im62 is caused to scroll, so that icons "J" and "K" disappear from view while icons "B" and "C" come into view.

Modification 2

In the foregoing exemplary embodiment, the magnifying operation for quick zoom is achieved by continuous pressing of Y button 161Y. However, the magnifying operation for quick zoom is not limited to this operation. For example, controller 100 may display a magnified image upon release of Y button 161Y when Y button 161Y is pressed once, and thereafter, may switch the displayed image from the magnified image to the normal-sized image when Y button 161Y is pressed again. Further, controller 100 may be configured to be able to perform these two methods of operation.

Figure 19:
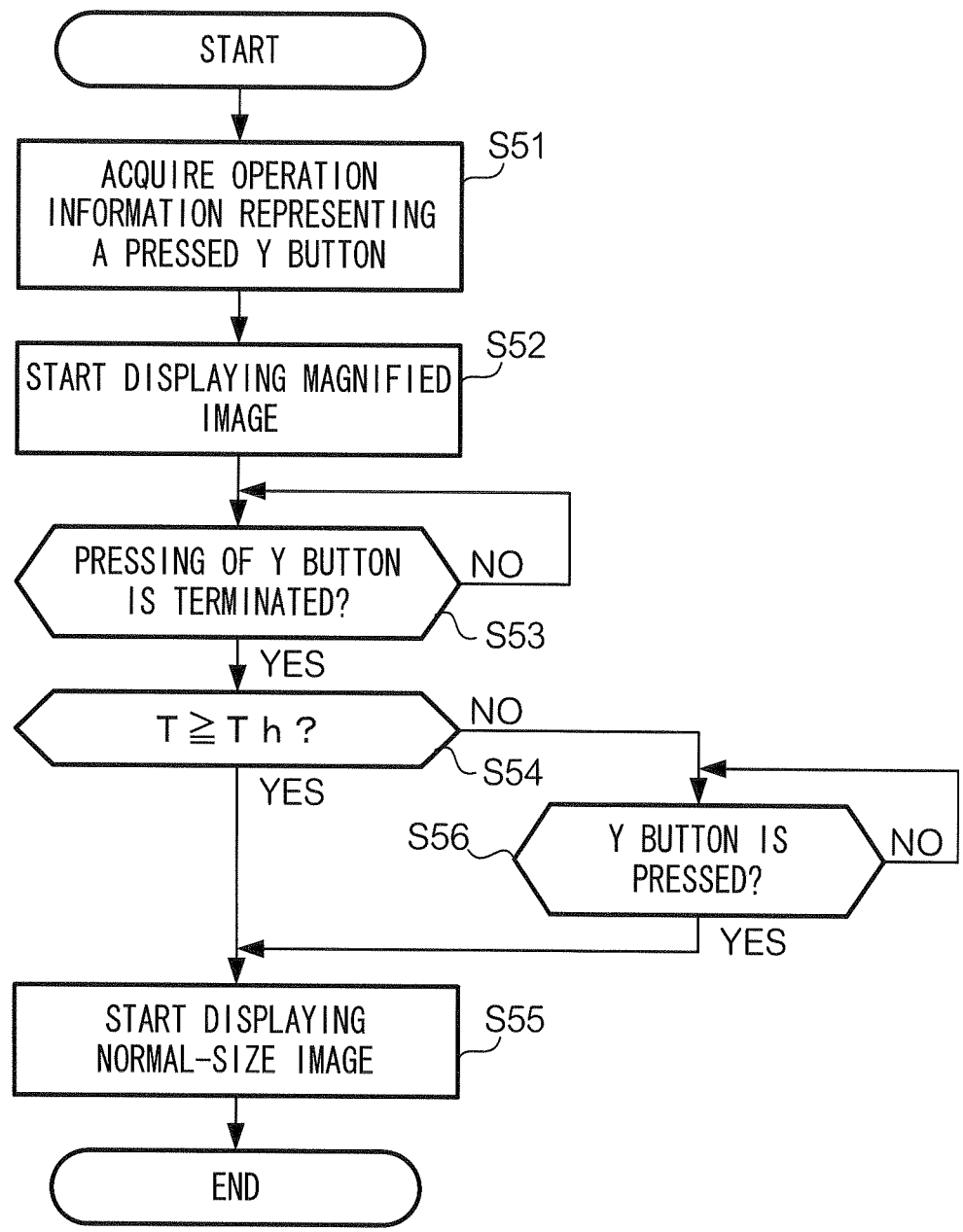
FIG. 19 is a flowchart showing an example of a non-limiting process executed by the base station.

FIG. 19 is a flowchart showing a process for achieving the aforementioned two ways of operation. In this process, upon acquisition of operation information indicating that Y button 161Y is pressed (step S51), control unit 310 of base station 300 starts display of a magnified image (step S52). It is assumed that Y button 161Y is continuously pressed at this moment.

After displaying the magnified image, control unit 310 determines whether Y button 161Y has been released, based on the operation information (step S53). Control unit 310 repeats this determination until Y button 161Y is released. Upon release of Y button 161Y, control unit 310 compares the duration time (T) of the pressing operation of Y button 161Y (i.e., magnifying operation) with a predetermined threshold value (Th) to determine whether the duration time of the magnifying operation (namely, the time period for which Y button 161Y was being pressed) is equal to or longer than a predetermined time period (step S54). It is to be noted that this threshold value may be a predetermined value, or may be a value that can be set by a user.

In the case where the duration time of the magnifying operation is equal to or longer than the predetermined time period, control unit 310 switches the displayed image from the magnified image to the normal-sized image in response to release of Y button 161Y (step S55). Control unit 310 achieves this by switching the image transmitted to controller 100. This method of operation corresponds to the method of operation described in the foregoing exemplary embodiment.

On the other hand, in the case where the duration time of the magnifying operation is shorter than the predetermined time period, control unit 310 causes the magnified image to be displayed continuously without causing the normal-sized image to be displayed, even if Y button 161Y is released. In this case, control unit 310 determines whether Y button 161Y is pressed again to cause the next magnifying operation to be performed (step S56). Then, if the next magnifying operation is performed, control unit 310 switches the displayed image from the magnified image to the normal-sized image (step S55).

This provides the user with choices for performing the magnifying operation. Thus, when the user wishes to have the magnified image displayed for an extended period of time, for example, the user does not have to press Y button 161Y continuously. Further, the user can select whichever operation s/he feels comfortable with in accordance with her/his preference.

Modification 3

Like image Im41 shown in FIG. 15, the normal-sized image displayed on controller 100 may be the same image as image Im42 displayed in display region 201 of monitor 200, or may be an image different from image Im42. For example, the normal-sized image displayed on controller 100 may be a part of image Im42 displayed in display region 201 of monitor 200. In this case, base station 300 may cause the indicator image (frame image) to be displayed not only when the magnifying operation is performed but also when it is not.

Namely, the normal-sized image displayed in display region 141 does not have to have the same magnification (or the same size) as that of the image displayed in display region 201 of monitor 200. The term "normal-sized" of the normal-sized image means that the image is unmagnified compared to a magnified image, and does not refer to comparison with the image displayed on monitor 200. It is to be noted that the magnification of the displayed image is represented relative to the normal-sized image displayed on controller 100, though it is also possible to represent the magnification relative to the image displayed on monitor 200.

Modification 4

The operation that causes the position indicated by the position information to return to the initial position is not limited to the scroll operation. For example, control unit 310 may cause the position indicated by the position information to return to the initial position in cases such as when an object such as a hyperlink is selected or when an icon displayed in menu images Im12 and Im13 is selected.

Modification 5

The present embodiment does not have to be carried out in a base station 300, in a display system including base station 300 and controller 100, or in a display system (display system 10) further including monitor 200, but also can be carried out in an information-processing device including integrally a configuration corresponding to base station 300 and a configuration corresponding to controller 100. Further, the display of the present embodiment does not have to be of a shape to be held with both hands, but may be of such a shape that it is to be held by a single hand, or may be adapted to be placed on a desk or the like when operated. The information-processing device of the present embodiment does not have to have a game function.

Further, the present embodiment may be carried out not only as an information-processing device or a display system as described in the foregoing, but also as a displaying method for causing a display to display a magnified image (partial image) or an information-processing program for executing such a displaying method. Furthermore, the information-processing program of the present embodiment may be stored in a storage medium such as an optical disk or a semiconductor memory, or may be downloaded to an information-processing device via a network such as the Internet.

Modification 6

In Exemplary operation 1 first display controller 311 displays a normal-sized image with the first magnification when an operation of displaying a magnified image of the normal-sized image is not performed, and displays a magnified partial image of the normal-sized image in the display when the operation is performed. A change of the scale of an image described in the foregoing may include display of an image after reduction (scaling down) as well as display of an image after magnification (scaling up). When displaying a reduced image, an operation of the present embodiment can be described by simply replacing "a magnification" with "a reduction."

In an embodiment in which a functionality of scaling up and down is implemented, a display controller, when an operation for changing a scale of an image is not performed, displays an image with a first scaling factor in a display, and when the operation for changing a scale of an image is performed, displays the partial image with a second scaling factor that is different from the first scaling factor in the display. The expression "displays an image with a second scaling factor in the display" described above includes a display of a partial image described in Modification 1 and a display of a reduced image described in Modification 6.

What is claimed is:

1. An information-processing device comprising:
a memory;
a display controller configured to, when a magnifying operation for magnifying a partial image, which is a predetermined part of a display image, is not performed, display the partial image with a first magnification, and when the magnifying operation is performed, display the partial image with a second magnification that is greater than the first magnification, and
a scroll controller configured to scroll the display image in response to a predetermined operation, wherein said device is operable such that,
when the display image is scrolled while the magnifying operation is not being performed, position of the partial image changes to a predetermined initial position irrelevant to the scrolling of the display image.

2. The information-processing device according to claim 1, the scroll controller is further configured to, when the magnifying operation is being performed, scroll the partial image in response to an input operation.

3. The information-processing device according to claim 2, wherein a position of the partial image is retained when the magnifying operation is stopped, and, when the magnifying operation is performed again after retention of the position, the display controller displays the partial image at the retained position with the second magnification.

4. The information-processing device according to claim 1, wherein
the predetermined operation is a scrolling operation, and the scroll controller scrolls the image, irrespective of whether the magnifying operation is being performed.

5. The information-processing device according to claim 2, further comprising a motion detector configured to obtain motion information indicative of a motion of the display, wherein the scroll controller scrolls the image based on the motion information.

6. The information-processing device according to claim 5, further comprising a grip sensor configured to detect that a display is held by a user,
wherein, when the display being held is detected, the scroll controller scrolls the image based on the motion information.

7. The information-processing device according to claim 5, wherein:
the display includes a hardware key or a software key, and
the scroll controller is configured to scroll the image based on a key input and the motion information, such that when an operation using the key is performed, a higher priority is given to the key input than to the motion information.

8. The information-processing device according to claim 2, further comprising a secondary display controller configured to display in a second display the image and an indicator indicating a position of the image, wherein the secondary display controller causes the indicator to move within the secondary display in accordance with the scrolling of the image, and when the indicator reaches a boundary of the display, causes the image displayed in the secondary display to change.

9. The information-processing device according to claim 1, further comprising a generator configured to generate an image data of the image to be displayed, wherein
the display controller:
in a case where the partial image is to be displayed with the second magnification, displays the partial image based on the image data in the display, and
in a case where the image is to be displayed, performs a predetermined processing on the image data generated by the generation unit and displays the image based on the processed image data.

10. The information-processing device according to claim 9, wherein
the display controller displays the partial image in a first mode in which the partial image is displayed with the second magnification, or in a second mode in which the partial image is displayed with a third magnification different from the first or second magnification, and
in a case where the partial image is to be displayed in the second mode, the generator generates the image data corresponding to the third magnification, and the first display controller displays the partial image in the display based on the generated image data.

11. The information-processing device according to claim 1, further comprising an object selector configured to select an object included in the image displayed in the display, wherein when the magnifying operation is not being performed and an object residing outside the partial image is in a selectable state, the object selector causes an object residing in the partial image to be in a selectable state responsive to the magnifying operation.

12. The information-processing device according to claim 1, wherein when the image is displayed, the first display controller displays an object for performing an operation relating to displaying an image, and when the partial image is displayed, the display controller does not display the object.

13. The information-processing device according to claim 1, wherein
the display controller:
in a case where a duration time of the magnifying operation is shorter than a predetermined time period, continues to display the partial image with the second magnification until another magnifying operation is performed; and
in a case where the duration time is equal to or longer than the predetermined time period, initiates displaying the partial image with the first magnification during the magnifying operation.

14. A non-transitory computer-readable medium storing a computer program that causes a computer to execute:
when a magnifying operation for magnifying a partial image, which is a predetermined part of a display image, is not performed, displaying the partial image with a first magnification, and when the magnifying operation is performed, displaying the partial image with a second magnification that is greater than the first magnification; and
scrolling the display image in response to a predetermined operation, wherein,
when the display image is scrolled while the magnifying operation is not being performed, position of the partial image changes to a predetermined initial position irrelevant to the scrolling of the display image.

15. A display system comprising:
a display configured to display an image; and
an information-processing device including:
a display controller configured to, when a magnifying operation for magnifying a partial image, which is a predetermined part of a display image, is not performed, display the partial image with a first magnification, and when the magnifying operation is performed, display the partial image with a second magnification that is greater than the first magnification, and
a scroll controller configured to scroll the display image in response to a predetermined operation, wherein said device is operable such that,
when the display image is scrolled while the magnifying operation is not being performed, position of the partial image changes to a predetermined initial position irrelevant to the scrolling of the display image.

16. An information-processing device comprising:
a processor system including at least one processor, the processor system being configured to:
when a scaling operation for changing a scale of an image to be displayed is not performed, display the image with a first magnification in a display, and when the operation is performed, display at least a part of the image with a second magnification that is different from the first magnification in the display, and
scroll the image in response to a predetermined operation, wherein,
when the image is scrolled while the scaling operation is not being performed, position of the at least a part of the image to be scaled and displayed changes to a predetermined initial position irrelevant to the scrolling of the image.

17. The information-processing device according to claim 16, the processor system being further configured to, when the scaling operation is being performed, scroll the at least a part of the image displayed in the display in response to an input made by a user.

18. The information-processing device according to claim 17, the processor system being further configured to obtain motion information indicative of a motion of the display, wherein the image is scrolled based on the motion information.

19. The information-processing device according to claim 18, further comprising a grip sensor configured to detect that a display is held by a user,
wherein, when the display being held is detected, the image is scrolled based on the motion information.

20. The information-processing device according to claim 18, wherein:
the display includes a hardware key or a software key, and
the image displayed in the display is scrolled based on a key input and the motion information, such that when an operation using the key is performed, a higher priority is given to the key input than to the motion information.

21. The information-processing device according to claim 16, the processor system being further configured to generate image data for displaying the image,
wherein
in a case where the at least a part of the image is to be displayed with the second magnification, the at least a part of the image is displayed in the display based on the image data; and
in a case where the image is displayed with the first magnification, a predetermined processing is performed on the image data, and the image is displayed in the display based on image data on which the predetermined processing has been performed.

22. The information-processing device according to claim 21, wherein
the at least a part of the image is displayed in a first mode with the second magnification, or in a second mode with a third magnification that is different from the first or second magnification, and
in a case where the at least a part of the image is to be displayed in the second mode, data of the image is generated corresponding to the third magnification, and the at least a part of the image is displayed in the display based on the generated data.

23. The information-processing device according to claim 16, wherein when the image is displayed with the first magnification, an object is displayed for performing an operation relating to the image, and when the at least a part of the image is displayed with the second magnification, the object is not caused to be displayed.

24. The information-processing device according to claim 16, wherein
in a case where a duration time of the scaling operation is shorter than a predetermined time period, the at least a part of the image is continually displayed with the second magnification until another scaling operation is performed; and
in a case where the duration time is equal to or longer than the predetermined time period, the image starts to be displayed with the first magnification during the scaling operation.

25. The information-processing device according to claim 16, wherein:
the scaling operation is displaying a reduced image of the image displayed in the display; and
the second magnification is smaller than the first magnification.

26. A non-transitory computer-readable medium that stores a computer program for causing a computer to execute:
when a scaling operation for changing a scale of an image to be displayed is not performed, displaying the image with a first magnification in a display, and when the scaling operation is performed, displaying the image with a second magnification that is different from the first magnification in the display; and
scrolling the image in response to a predetermined operation, wherein,
when the image is scrolled while the scaling operation is not being performed, position of the at least a part of the image to be scaled and displayed changes to a predetermined initial position irrelevant to the scrolling of the image.

27. A display system comprising:
a display configured to display an image; and
an information-processing device including a display controller configured to, when a scaling operation for changing a scale of an image to be displayed is not performed, display the image with a first magnification in the display, and when the scaling operation is performed, display the image with a second magnification that is different from the first magnification in the display,
a scroll controller configured to scroll the image in response to a predetermined operation, wherein said device is operable such that,
when the image is scrolled while the scaling operation is not being performed, position of the at least a part of the image to be scaled and displayed changes to a predetermined initial position irrelevant to the scrolling of the image.

* * * * *